(12) United States Patent
Higashi

(10) Patent No.: US 9,458,962 B2
(45) Date of Patent: *Oct. 4, 2016

(54) EXTENSION/RETRACTION DEVICE

(71) Applicant: Kazuo Higashi, Yamaguchi (JP)

(72) Inventor: Kazuo Higashi, Yamaguchi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/992,078

(22) Filed: Jan. 11, 2016

(65) Prior Publication Data

US 2016/0123523 A1    May 5, 2016

Related U.S. Application Data

(63) Continuation of application No. 14/194,044, filed on Feb. 28, 2014, now Pat. No. 9,261,226, which is a continuation of application No. PCT/JP2011/069844, filed on Aug. 31, 2011.

(51) Int. Cl.
| | |
|---|---|
| *F16M 11/00* | (2006.01) |
| *F16M 11/26* | (2006.01) |
| *F16M 11/32* | (2006.01) |
| *A47B 9/02* | (2006.01) |
| *F16B 7/14* | (2006.01) |

(52) U.S. Cl.
CPC .............. *F16M 11/26* (2013.01); *A47B 9/02* (2013.01); *F16B 7/14* (2013.01); *F16M 11/32* (2013.01)

(58) Field of Classification Search
CPC .................................................. F16M 11/26

USPC ......... 248/644, 676, 121, 125.8, 125.9, 161, 248/410, 157, 177.1, 187.1, 354.1, 354.3, 248/354.6, 407, 411; 403/109.1, 109.2, 403/109.5, 377, 378, 379.5
See application file for complete search history.

(56) References Cited

U.S. PATENT DOCUMENTS

| | | | |
|---|---|---|---|
| 9,261,226 B2 * | 2/2016 | Higashi ................. | F16M 11/32 |
| 2014/0175237 A1 * | 6/2014 | Higashi ................. | F16M 11/32 248/188.5 |

* cited by examiner

*Primary Examiner* — Terrell McKinnon
*Assistant Examiner* — Michael McDuffie
(74) *Attorney, Agent, or Firm* — Nakanishi IP Associates, LLC

(57) ABSTRACT

An extension/retraction device includes a cylindrical stationary leg section having a base at the upper end thereof, a cylindrical movable leg section in which the stationary leg section is fitted so as to be slidable in the longitudinal direction, an engagement tube having an upper end formed in a stepped shape and installed in the stationary leg section so as to be coaxial with the movable leg section and so as to be pivotable about the cylinder axis of the movable leg section, a pressing spring installed within both the movable leg section and the stationary leg section, a pulling spring held within the pressing spring, a guide tube having an upper end affixed to the base and installed in the engagement tube, an engagement section fitted to the lower end of the engagement tube, and a spacer installed between the lower end of the guide tube and the engagement tube.

10 Claims, 17 Drawing Sheets

FIG. 1 (a)
FIG. 1 (b)
FIG. 1 (c)
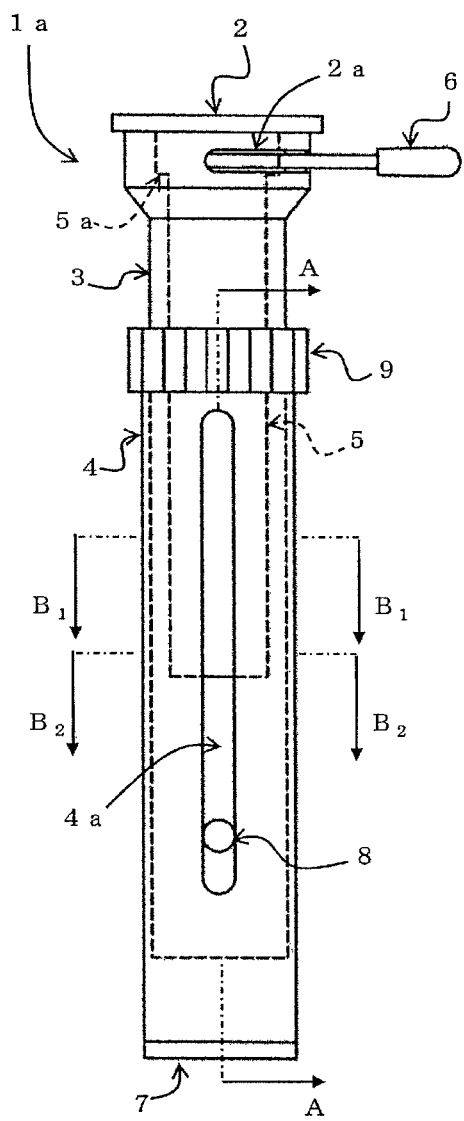
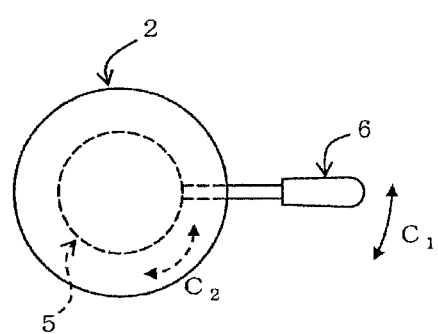
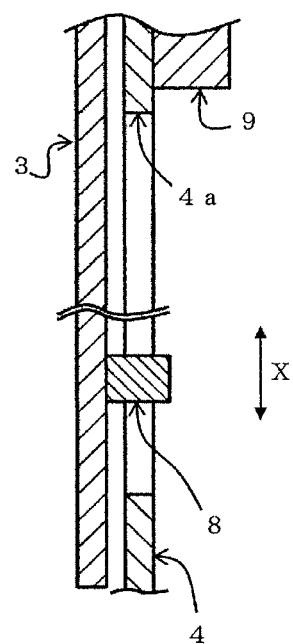

FIG. 3 (a)
FIG. 3 (b)
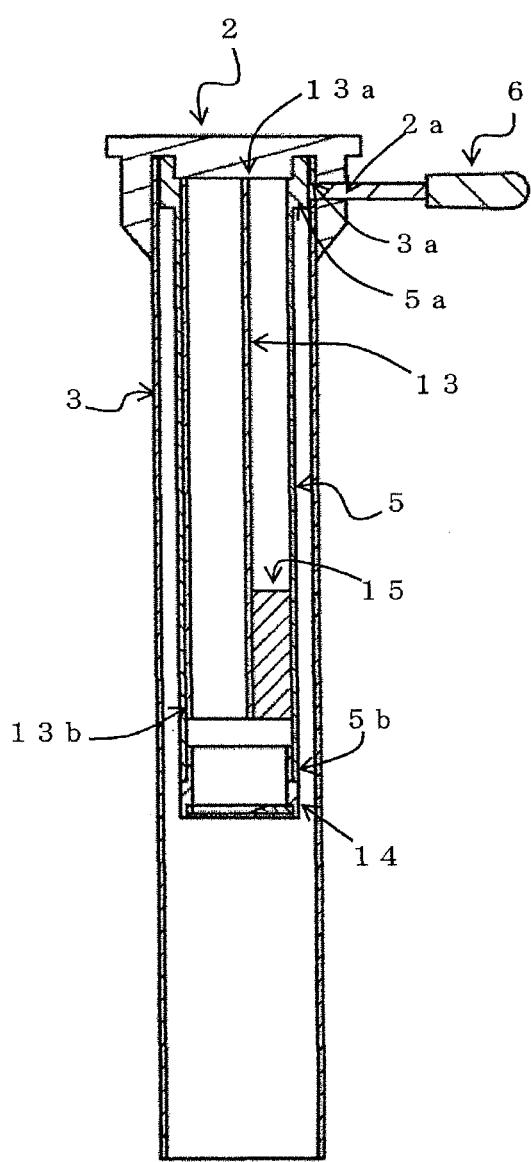
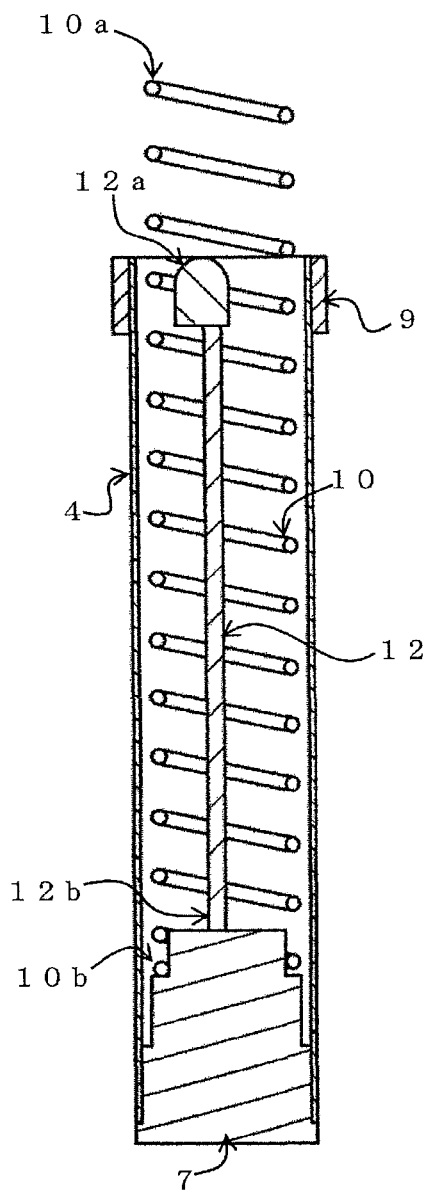

FIG. 7 (a)
FIG. 7 (b)
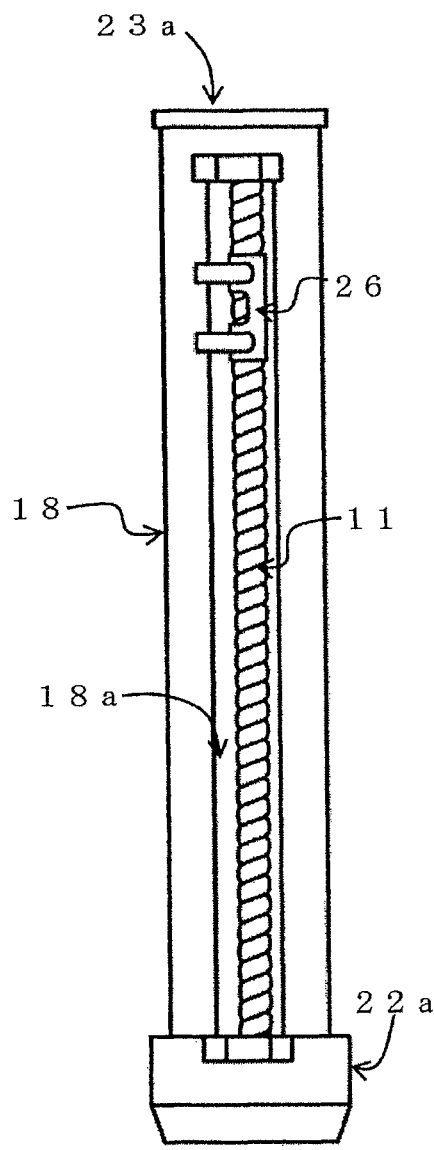
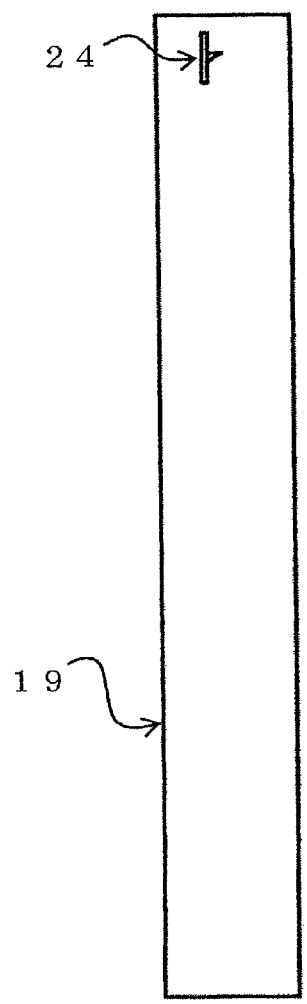

FIG. 13 (a)
FIG. 13 (b)
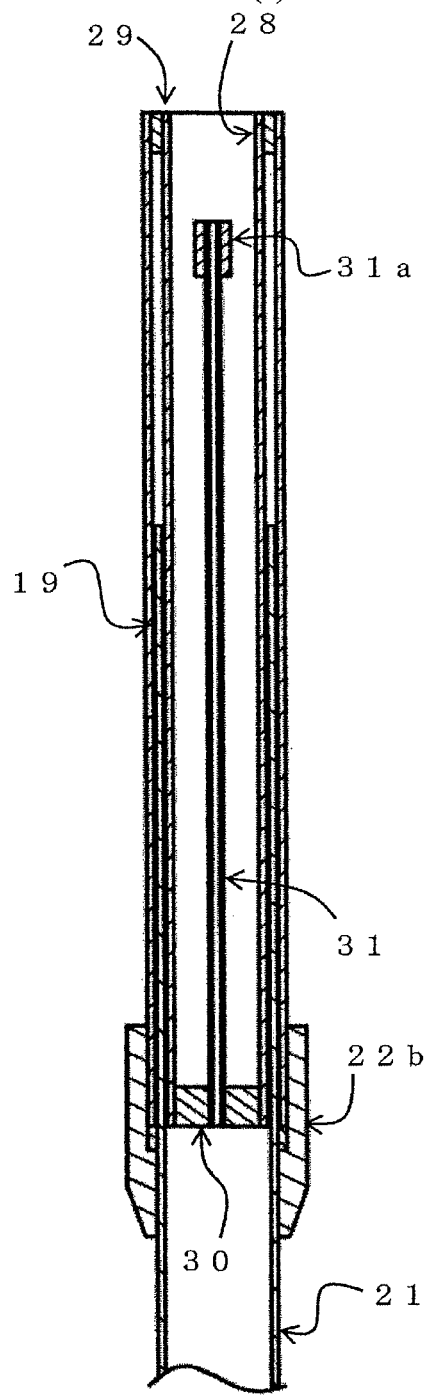
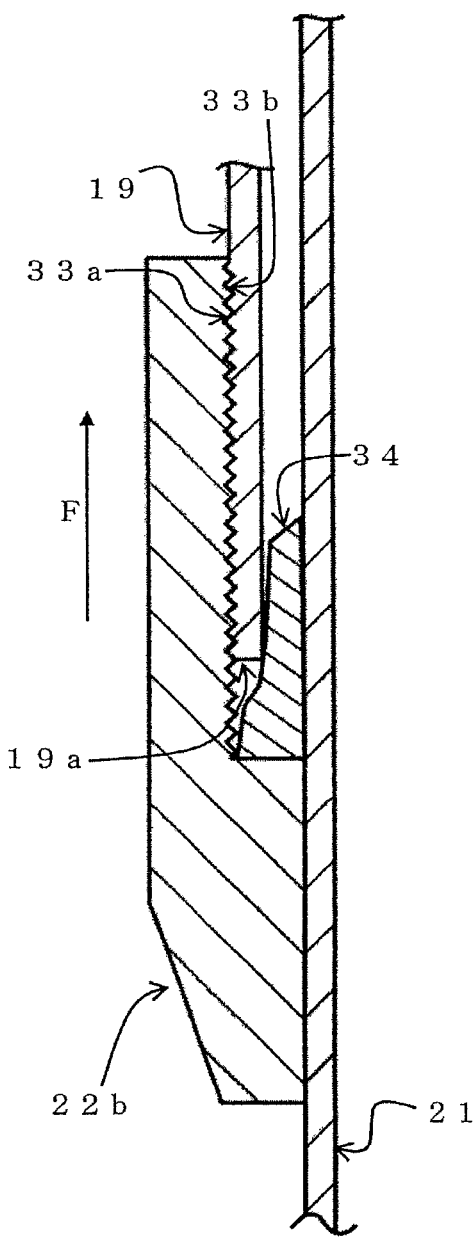

EXTENSION/RETRACTION DEVICE

CROSS-REFERENCE TO RELATED APPLICATIONS

Technical Field

This application continuation application and thus claims benefit pursuant to 35 U.S.C. §120, of U.S. patent application Ser. No. 14/194,044, which is a continuation application of International Patent Application No. PCT/JP2011/069844 filed on Aug. 31, 2011, the entire contents of which are incorporated herein by reference.

BACKGROUND OF INVENTION

1. Field of the Invention

The present invention relates to an extension/retraction device to be used for a tripod of a camera or the like, and relates more specifically to an extension/retraction device configured so that the length can be adjusted steplessly and so that the length can be maintained easily.

2. Background Art

In recent years, the change from journalizing processing in which journal entries are recorded in a ledger in detail every day to journalizing processing in which pieces of data are input by installing accounting software on personal computers has been made in daily account/tax processing jobs in business enterprises, organizations, and sole proprietors.

In general, a tripod of a camera, a stepladder or the like is configured so that the length of a leg section can be adjusted freely, and furniture such as a table or a chair is also configured so that the length of a leg section can be adjusted. As an element (which will be hereinafter referred to as an extension/retraction device) for making the length of a leg section variable, a structure for fitting a movable leg section at a lower side in or on a stationary leg section at an upper side so as to be extended and retracted freely in the longitudinal direction and affixing the position of the movable leg section using a thumbscrew or the like is known, for example. Such a structure, however, has a problem that operation of a thumbscrew takes time and therefore adjustment of the length of a leg section cannot be achieved in a short time. Therefore, a simple structure for adjusting the length of a leg section efficiently is required in recent years as solution for the above problem, and some new devices have been made regarding a simple structure.

For example, Patent Document 1 discloses a tripod named "Tripod for Surveying Machine," which is configured so that a movable leg is supported on as to be freely slidable along the longitudinal direction with respect to a stationary leg which has an upper part supported at a tripod head section so as to be freely pivotable and so that the movable leg is affixed and held at a desired relative position with respect to the stationary leg.

The tripod in Patent Document 1 is provided with, as a device for affixing and holding the movable leg: an engagement member which runs along the longitudinal direction of the movable leg; a displacement member which is installed so as to be freely movable integrally with the movable leg and so as to be displaceable between a first state to be frictionally engaged with an engagement member and a second state to be separated from the engagement member; and a biasing member for biasing the displacement member to the first state.

Such a structure has an effect that slide movement of the movable leg is regulated when the displacement member is biased by the biasing member and frictionally engaged with the engagement member. Moreover, such a structure has an effect that slide movement of the movable leg is allowed when the displacement member is separated from the engagement member against bias force of the biasing member. Accordingly, it is possible to simply achieve extension/retraction adjustment of a leg section and easily achieve fine adjustment of the height of a tripod.

Moreover, Patent Document 2 discloses a device named "Extension/Retraction Device," which is an extension/retraction structure of a leg section that is to be used for a tripod or the like and is configured so that the length of the leg section can be adjusted easily and so that the device can be downsized.

The device disclosed in Patent Document 2 is provided with: a leg section which is a hollow cylinder having a window section at a part thereof and which has an open end; an extension/retraction leg section which has a tip section fitted in the open end of the leg section and which can slide at the inside thereof; a spiral length adjustment member which is located in series with the extension/retraction leg section from the tip section of the extension/retraction leg section; an extension/retraction member which is held inside the leg section and which is provided from the tip section of the extension/retraction leg section and located inside or outside the length adjustment member; and an engagement member for engaging at least the length adjustment member at the window section provided at the leg section.

With such a structure, when the extension/retraction leg section slides and is inserted into the leg section, the length adjustment member slides in conjunction therewith and the extension/retraction member is retracted. In addition, when the engagement member is inserted from the window section of the leg section at the time the extension/retraction leg section slides to a desired length, the engagement member penetrates a space of the length adjustment member positioned at the window section, so that movement of the length adjustment member, the extension/retraction leg section and the extension/retraction member are inhibited. On the other hand, when the engagement member is removed from the space of the length adjustment member, bias force of the extension/retraction member, which has been retracted, automatically extends the extension/retraction leg section. Moreover, when a pulling spring formed in a spiral shape is used as the length adjustment member, a number of spaces which can be penetrated by the engagement member exist steplessly, and it is therefore possible to freely achieve length adjustment. Furthermore, it is possible to downsize the entire device, since the extension/retraction member is located inside or outside the length adjustment member.

CITATION LIST

Patent Document 1: Japanese Published Unexamined Patent Application No. 2010-286286
Patent Document 2: Japanese Patent No. 4545778

However, in the tripod of the above conventional technology disclosed in Patent Document 1, the engagement state of the displacement member with the engagement member depends on frictional force which acts therebetween, and therefore there is a fear that the engagement state may possibly be released easily when strong force is applied to the movable leg to cause slide movement with respect to the stationary leg. That is, there is a problem that such a tripod cannot support a heavy load safely and has limited uses.

Moreover, in the device disclosed in Patent Document 2, an engagement member is formed to have a projection which is projected outward on the outer circumferential section of the leg section, and therefore, there is a fear that the engagement member may possibly be an obstacle by touching the body or the like of the user, for example, when being in use. Furthermore, it is necessary to provide, in the length adjustment member, a long stroke in the radial direction so that the engagement member is put into the length adjustment member deeply.

SUMMARY OF INVENTION

Various embodiments of the claimed invention for addressing the above issues will be explained individually below. As may be required, the characteristic operational effects of the embodiments will also be described. One or more embodiments of the claimed invention has been made to cope with such a conventional situation, and the object thereof is to provide an extension/retraction device configured so that fine adjustment of the length of a leg section is facilitated and so that, in a length adjustment member, an engagement section can be reliably engaged without providing the leg section with a long stroke in the radial direction of the leg section.

As the first embodiments of the claimed invention, one or more embodiments include: a cylindrical movable leg section; a spiral length adjustment member which is installed parallel to a longitudinal direction of the movable leg section; an engagement section which is formed to be able to be engaged with the length adjustment member; an engagement tube on which the engagement section is affixed so as not to be movable and which is to be fitted in the movable leg section so as to be slidable in the longitudinal direction; and an extension/retraction member, which is installed in parallel with the length adjustment member in the movable leg section, for biasing the engagement tube in a direction of separating from the movable lea section, wherein the engagement tube is installed so as to be pivotable about the center of the cylindrical shape of the movable leg section, the length adjustment member has one end affixed to the movable leg section and the other end fitted into the engagement tube so as to be freely slidable in the longitudinal direction, and the engagement section is installed so as to penetrate a space of the length adjustment member while pivoting or so as to be removed from a space while pivoting in conjunction with relative pivoting of the movable leg section and the engagement tube.

An extension/retraction device having such a structure has an effect that the extension/retraction member is retracted and the length adjustment member slides in the longitudinal direction of the engagement tube when the engagement tube is pushed into the movable leg section. Moreover, the engagement section is engaged with the length adjustment member and the position of the movable leg section in the longitudinal direction with respect to the engagement tube is affixed by a simple operation of pivoting the movable leg section with respect to the engagement tube. Furthermore, the extension/retraction device also has an effect that the position of the movable leg section in the longitudinal direction with respect to the stationary leg section is set at a short interval by engaging the engagement section for each interval of a spiral part of the length adjustment member. In addition, there is no fear that the engagement section interferes with the extension/retraction member in the process of engaging the engagement section with the length adjustment member. Also, the extension/retraction device has an effect that a variation in the total length of the extension/retraction member in the process of sliding the movable leg section with respect to the stationary leg section is smaller than a case where the length adjustment member is installed in series with the extension/retraction member.

Moreover, as the second embodiments of the claimed invention, one or more embodiments are the extension/retraction device further include: a stationary leg section in which at least a part of the extension/retraction member and the engagement tube are held and which is fitted in the movable leg section so as to be slidable in the longitudinal direction; and a guide member for guiding the stationary leg section so as not to be pivotable and so as to be slidable with respect to the movable leg section, wherein an end of the engagement tube is supported by the stationary leg section so as to be pivotable.

An extension/retraction device having such a structure has an effect that a part of both of the extension/retraction member and the engagement tube projected from the movable leg section is covered with the stationary leg section.

As the third embodiments of the claimed invention, in one or more embodiments, the length adjustment member is not installed in the engagement tube so as to be slidable in the longitudinal direction with an end thereof being affixed to the movable leg section but installed on an outer surface of the movable leg section outside the engagement tube with both ends thereof being affixed, and a window section is formed on at least a part of aside surface of the movable leg section along the cylinder axis so that the engagement section is projected and can be engaged with the length adjustment member.

An extension/retraction device having such a structure has the effect of the first embodiments of the claimed invention, and furthermore, checking of the engagement state of the engagement section with the length adjustment member is facilitated since the length adjustment member is installed outside the movable leg section.

As the fourth embodiments of the claimed invention, one or more embodiments include: a coupling section installed at one of end sections of the movable leg section, in which the engagement tube is not fitted, so as to be freely pivotable about the cylinder axis; and a coupling member for coupling the coupling section with the engagement tube so as not to be pivotable and so as to be slidable.

An extension/retraction device having such a structure has the effect of the third embodiments of the claimed invention, and further has an effect that the coupling section and the engagement tube do not pivot independently of each other in the process of pivoting the movable leg.

As the fifth embodiments of the claimed invention, one or more embodiments are the extension/retraction device, in which the engagement tube is not provided with the engagement section but provided with a recessed groove in which the length adjustment member is held which is provided at a side surface along the longitudinal direction, the length adjustment member is not installed at the movable leg section but installed in the recessed groove so as not to come into contact with an inner surface of the movable leg section, and the movable leg section is not provided with the window section but provided with the engagement section which is installed on an inner surface so as to be able to be engaged with the length adjustment member with relative pivoting with respect to the engagement tube.

An extension/retraction device having such a structure has the effect of the third and fourth embodiments of the claimed invention, and further has an effect that a projection section is not generated in installation of the engagement section or the length adjustment member on an outer surface of the movable leg section. Moreover, the extension/retraction device has an effect that the length adjustment member can be viewed easily by detaching the movable leg section from the engagement section.

As the sixth embodiments of the claimed invention, one or more embodiments are the extension/retraction device according to any one of the first to fifth embodiments of the claimed invention, in which a length adjustment member laminated annularly is used instead of the spiral length adjustment member.

An extension/retraction device having such a structure has the effect of the first to fifth embodiments of the claimed invention, and further has an effect that the length adjustment member laminated annularly enables engagement of the engagement section with a space between annular bodies.

As described above, according to the first embodiments of the claimed invention, it is possible to adjust the total length to a desired length. In the process, it is possible to achieve fine adjustment of the length easily. Moreover, by pivoting the engagement tube, it is possible to reliably engage the engagement section with the length adjustment member without providing the engagement tube with a long stroke in the radial direction of the engagement tube. Furthermore, force required for extension/retraction does not vary widely, and this improves the handleability.

According to the second embodiments of the claimed invention, it is possible to prevent an accident that the hand of a user is pinched in an extension/retraction member, for example, in addition to the effect of the invention according to Claim 1, since the extension/retraction member is not exposed. Moreover, it is also possible to avoid a situation that a user touches the engagement tube and the engagement state of the engagement section when the length adjustment member is released erroneously, for example.

According to the third embodiments of the claimed invention, it is possible to achieve inspection, repair or the like of the engagement section or the length adjustment member efficiently, in addition to the effect according to the first embodiments of the claimed invention. Moreover, it is also possible to decrease the diameter of the movable leg section so as to downsize the entire device.

According to the fourth embodiments of the claimed invention, it is possible to pivot only the movable leg section independently when a coupling section is coupled with another device or the like and the engagement tube is grounded, for example, in addition to provision of the effect of the third embodiments of the claimed invention. Accordingly, it is possible to achieve operation to affix the length of the extension/retraction device safely and easily.

According to the fifth embodiments of the claimed invention, effects of simple appearance and excellent design are provided, in addition to the effect of the third or fourth embodiments of the claimed invention. Moreover, it is possible to achieve inspection, repair or the like of the length adjustment member efficiently.

According to the sixth embodiments of the claimed invention, a length adjustment member laminated annularly is provided with a plurality of places to be engaged with the engagement section as with a spiral length adjustment member, and therefore it is possible to achieve fine adjustment of the length of the extension/retraction device, in addition to provision of the effect of the first to fifth embodiments of the claimed invention.

Other aspects and advantages of the claimed invention will be apparent from the following description and the appended claims.

BRIEF DESCRIPTION OF DRAWINGS

FIG. 1(a) is a front view for illustrating the appearance of Example 1 of an extension/retraction device according to an embodiment of the present invention. FIG. 1(b) is a plan view for illustrating the appearance of Example 1 of an extension/retraction device according to an embodiment of the present invention. FIG. 1(c) is a partially enlarged view of a cross section indicated by the arrow A-A in FIG. 1(a).

FIG. 3(a) is a longitudinal sectional view for illustrating a state where FIG. 2 is disassembled. FIG. 3(b) is a longitudinal sectional view for illustrating a state where FIG. 2 is disassembled.

FIG. 7(a) is a front view for illustrating the appearance of a movable leg section which composes Example 2 of an extension/retraction device according to an embodiment of the present invention. FIG. 7(b) is a front view for illustrating the appearance of an engagement tube which composes Example 2 of an extension/retraction device according to an embodiment of the present invention.

FIG. 13(a) is a longitudinal sectional view for illustrating a state where an engagement tube and an extension/retraction leg section are assembled. FIG. 13(b) is a view wherein the vicinity of a gripper of an engagement tube in FIG. 13(a) is enlarged.

DETAILED DESCRIPTION

Figure 2:
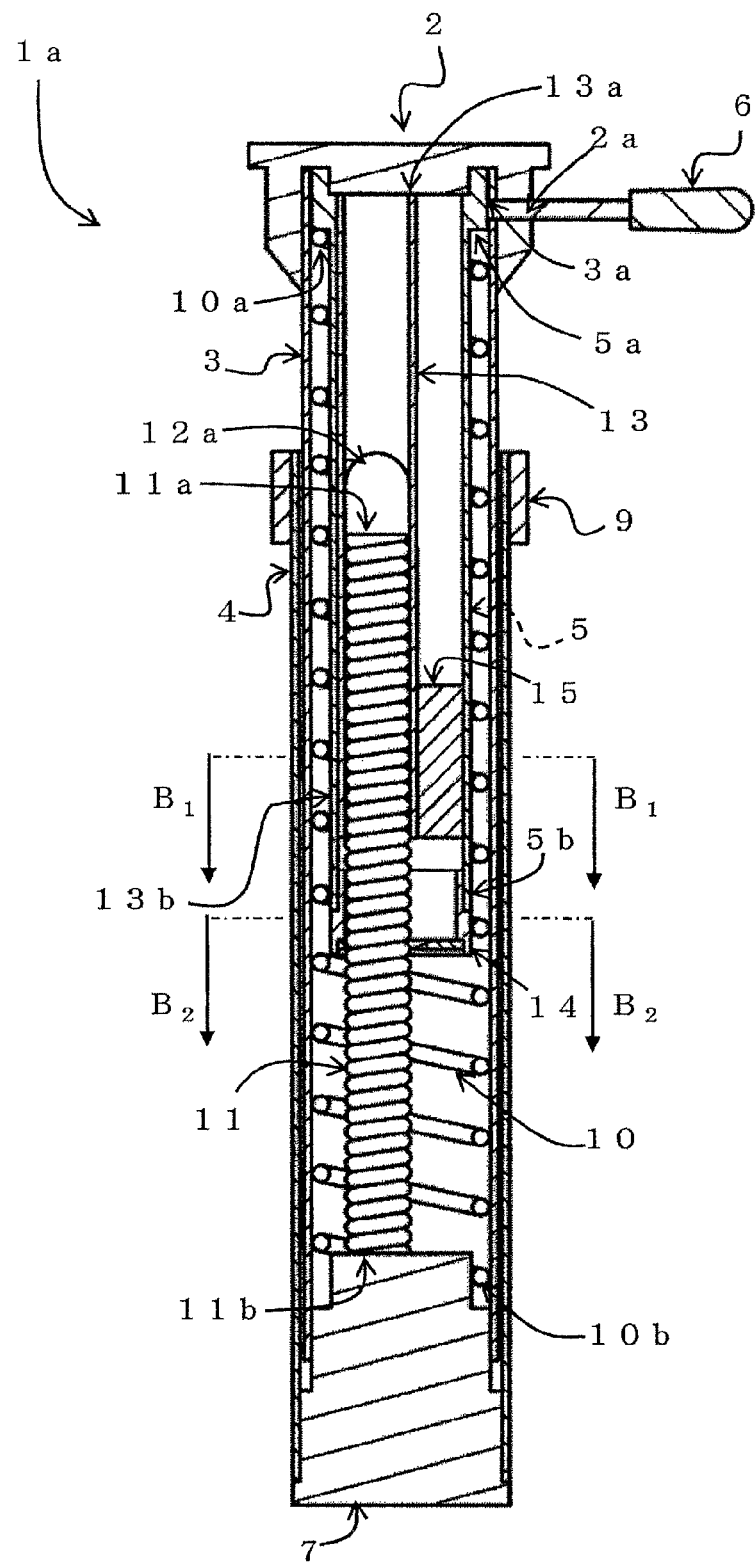
FIG. 2 is a longitudinal sectional view of FIG. 1(a).

One or more embodiments of the claimed invention will be explained below while referring to figures. An extension/retraction device according to one or more embodiments of the claimed invention is to be used as a leg section of a tripod of a camera, a stepladder, a ladder, a chair or the like The following description will explain the detailed structure with reference to FIGS. 1 to 17.

EXAMPLE 1

An extension/retraction device of the present example will be described using FIGS. 1 to 5 (corresponding especially to Claim 1 or 2). FIGS. 1(a) and 1(b) are a front view and a plan view for respectively illustrating the appearance of an extension/retraction device of the present example, and FIG. 1(c) is a partially enlarged view of a cross section indicated by the arrow A-A in FIG. 1(a).

As illustrated in FIG. 1(a), an extension/retraction device 1a is provided with: a cylindrical stationary leg section 3 having an upper end attached to a base 2 on which various machinery or the like is to be installed; a cylindrical movable leg section 4 in which the stationary leg section 3 is fitted so as to be slidable in the longitudinal direction; and an engagement tube 5 which has an upper end 5a formed in a stepped shape and which is installed within the stationary leg section 3 so as to be coaxial with the movable leg section 4. Moreover, an upper end of the engagement tube 5 is attached to the base 2 in such a manner that the engagement tube 5 can pivot about the cylinder axis of the movable leg section 4. That is, an upper end of the engagement tube 5 is supported by the stationary leg section 3 via the base 2 in such a manner that the engagement tube 5 can pivot. In addition, an operating lever 6 is erected on an outer circumferential surface in the vicinity of the upper end. Furthermore, openings 2a and 3a (see FIG. 2) through which the operating lever 6 is to be projected are formed on a side surface of the base 2 and on a side surface of the stationary leg section 3 respectively along the circumferential directions so as to correspond to the excursion. In such a case, when the operating lever 6 is pivoted as illustrated by the arrow $C_1$ in FIG. 1(b), the engagement tube 5 pivots as indicated by the arrow $C_2$.

An annular gripper 9 is attached to an upper end of the movable lea section 4, and a plug body 7 is fitted to a lower end of the movable leg section 4. It is to be noted that a plurality of slip stopper grooves are formed in an uneven shape on the outer circumferential surface of the gripper 9. Moreover, a guide hole 4a is formed in a long hole shape on a side surface of the movable leg section 4 along the longitudinal direction, and a columnar projection 8 is affixed on a side surface of the stationary leg section 3 with an upper part thereof being exposed from the guide hole 4a as illustrated in FIG. 1(c). In such a case, when the movable leg section 4 is moved as indicated by the arrow X, the stationary leg section 3 is inserted into the movable leg section 4 while the projection 8 is guided by the guide hole 4a. That is, when the movable leg section 4 is slid with respect to the stationary leg section 3, the guide hole 4a and the projection 8 function as a guide member for regulating relative pivoting of the stationary leg section 3 and the movable leg section 4.

Figure 4:
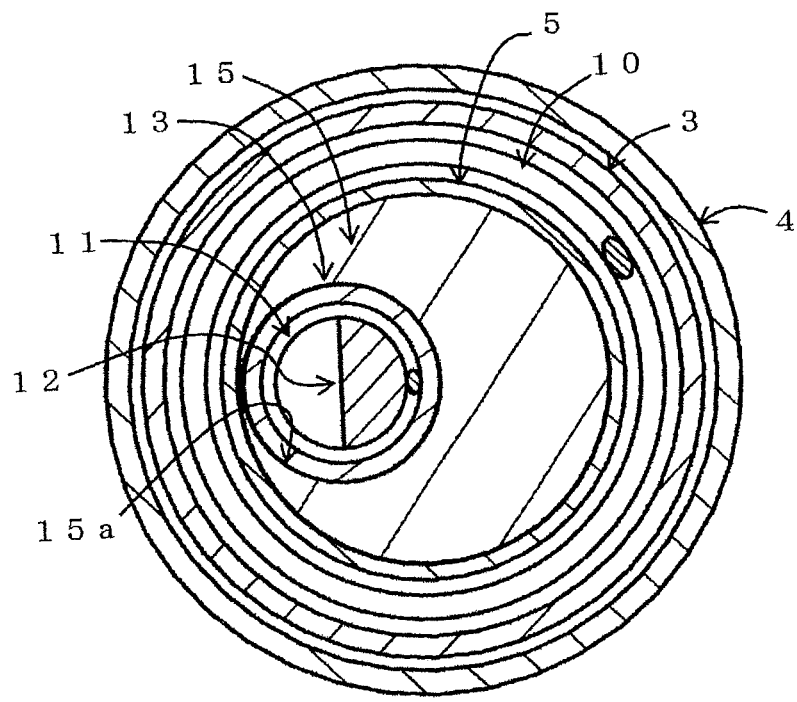
FIG. 4(a) is an enlarged view of a cross section indicated by the arrow $B_1$-$B_1$ in FIG. 1(a).
FIG. 4(b) is an enlarged view of a cross section indicated by the arrow $B_2$-$B_2$ in FIG. 1(a).
Figure 4:
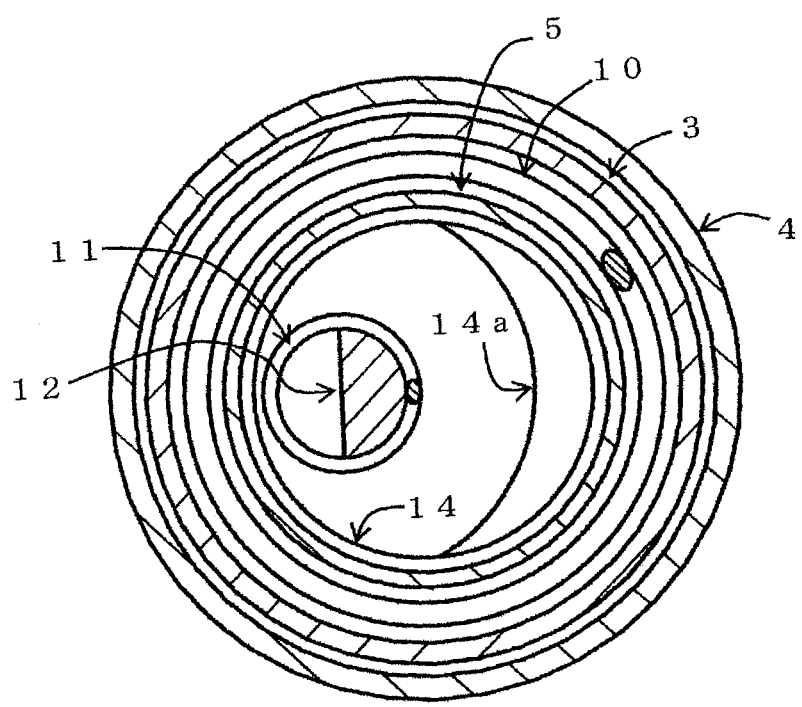
Figure 5:
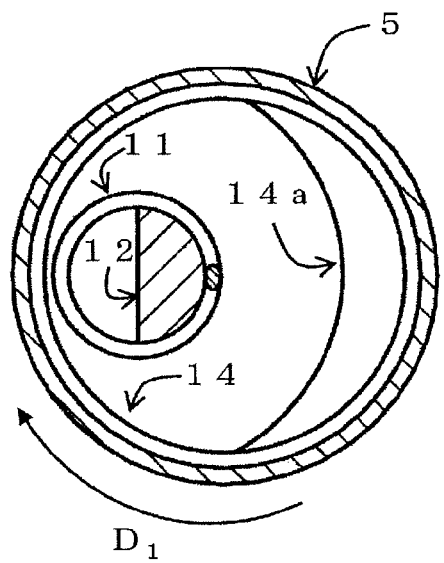
FIGS. 5(a) and 5(b) are views wherein a part of FIG. 4(b) is omitted.
Figure 5:
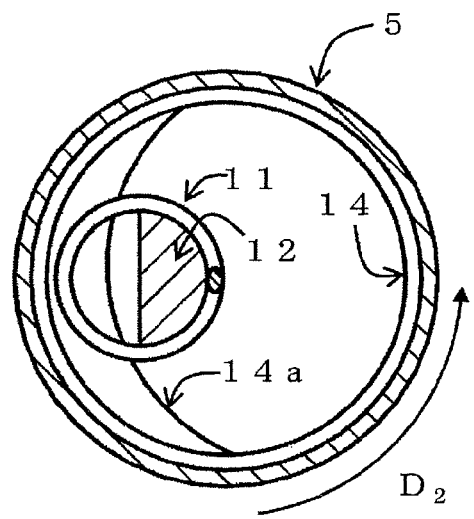

FIG. 2 is a longitudinal sectional view for explaining the extension/retraction mechanism of the extension/retraction device 1a, FIGS. 3(a) and 3(b) are longitudinal sectional views for illustrating a state where the extension/retraction device 1a is disassembled. FIGS. 4(a) and 4(b) are enlarged views respectively of a cross section indicated by the arrow $B_1$-$B_1$ in FIG. 1(a) and a cross section indicated by the arrow $B_2$-$B_2$. FIGS. 5(a) and 5(b) are views for explaining a state where the engagement section is engaged with a pulling spring 11 and corresponds to a view wherein a part of FIG. 4(b) is omitted. It is to be noted that constituent elements other than the pulling spring 11 and a core 12 are displayed in a cross section in FIG. 2, and hatching which indicates a cross section regarding a pressing spring 10 is omitted in FIGS. 2 and 3(b). Moreover, in order to clarify the positions of the line $B_1$-$B_1$ and the line $B_2$-$B_2$ illustrated in FIG. 1(a) in the axial direction with respect to the engagement tube 5, the lines are also illustrated in FIG. 2. In addition, illustration of the pulling spring 11 is omitted in FIG. 3(b). Furthermore, like symbols are attached in FIGS. 2 to 4 to constituent elements illustrated in FIG. 1, and explanation thereof is omitted.

As illustrated in FIGS. 2 to 4, the pressing spring 10 is installed within the movable leg section 4 and the stationary lea section 3, and the pulling spring 11 is held within the pressing spring 10. It is to be noted that "a pressing spring" in the present specification refers to an element, which is a spiral elastic member having a space under normal condition and exhibits a reaction force when the total length is retracted with a spiral interval being narrowed, and "a pulling spring" refers to an element, which is a spiral elastic member having little space under normal condition and exhibits a reaction force when the total length is extended with a spiral interval being widened. Here, the reaction force of such "a pulling spring" is not absolutely necessary, and therefore an extension/retraction device 1a of the present example can use a member in the same shape (a spiral member) having no elastic force instead of "a pulling spring."

Installed within the pulling spring 11 is a semicolumnar core 12 having an upper end 12a formed in a stepped shape and a lower end 12b affixed to the plug body 7. In addition, an upper end 10a of the pressing spring 10 abuts the upper end 5a of the engagement tube 5, and a lower end 10b of the pressing spring 10 is affixed to the plug body 7. That is, the pressing spring 10 functions as an extension/retraction member for biasing the engagement tube 5 in a direction separating from the movable leg section 4.

Moreover, an upper end 11a and a lower end 11b of the pulling spring 11 are respectively affixed to the upper end 12a of the core 12 and to the plug body 7. On the other hand, installed within the engagement tube 5 is a guide tube 13 having an upper end 13a affixed to the base 2, and the upper ends 11a and 12a of both of the pulling spring 11 and the core 12 are installed within the guide tube 13 so as to be slidable in the longitudinal direction. Moreover, an engagement section 14 is fitted to a lower end 5b of the engagement tube 5.

Moreover, a spacer 15 is installed between a lower end 13b of the guide tube 13 and the engagement tube 5. It is to be noted that only an inner circumferential surface 15a of the spacer 15 is affixed to the guide tube 13 (see FIG. 4(a)) so as not to hamper pivoting of the engagement tube 5. In addition, a stopper 14a having a falcate planar view is attached to an end section of the engagement section 14 as illustrated in FIGS. 3(a) and 4(b).

When the operating lever 6 is operated in the state illustrated in FIG. 5(a) so as to pivot the engagement tube 5 in the direction of the arrow $D_1$, the stopper 14a pivots together with the engagement tube 5 as illustrated in FIG. 5(b) and is pushed into a spiral space of the pulling spring 11. Thus, movement of the pulling spring 11 is inhibited. Here, the position of the movable leg section 4 in the longitudinal direction with respect to the stationary leg section 3 is affixed, since the lower end 11b of the pulling spring 11 is connected with the movable leg section 4 via the plug body 7 and the engagement tube 5 is connected with the stationary leg section 3 via the base 2. At this time, the pulling spring 11 functions as a length adjustment member. That is, the extension/retraction device 1a has an effect that the length is decided by pivoting the engagement tube 5 and engaging the engagement section 14 with the pulling spring 11 which is a length adjustment member.

It is to be noted that, when the operating lever 6 is operated from the state illustrated in FIG. 5(b) so as to pivot the engagement tube 5 in the direction of the arrow $D_2$, the engagement section 14 pivots together with the engagement tube 5 as illustrated in FIG. 5(a) and the stopper 14a is removed from a spiral space of the pulling spring 11, and therefore the engagement state of the engagement section 14 with the pulling spring 11 is released. As a result, it becomes possible to extend and retract the extension/retraction device 1a.

The extension/retraction device 1a having such a structure has an effect that, when the stationary leg section 3 is pushed into the movable leg section, the pressing spring 10 is retracted and the pulling spring 11 slides in the longitudinal direction in the engagement tube 5. Moreover, the extension/retraction device 1a also has an effect that the position of the movable leg section 4 in the longitudinal direction with respect to the stationary leg section 3 is set at a short interval by engaging the engagement section 14 for each interval in a spiral section of the pulling spring 11.

Furthermore, the pulling spring 11 and the engagement section 14 are held in the pressing spring 10, and therefore there is no fear that the engagement section 14 interferes with the pressing spring 10 in the process of engaging the engagement section 14 with the pulling spring 11. Moreover, the extension/retraction device 1a also has an effect that a variation in the total length of the pressing spring 10 in the process of sliding the movable leg section 4 with respect to the stationary leg section 3 is smaller than a case where the pulling spring 11 is installed in series with the pressing spring 10.

It is to be noted that it is required, in a structure wherein an engagement blade (corresponding to the stopper 14a in the extension/retraction device 1a) in the diameter direction of the pulling spring 11, to set the diameter of the pulling spring 11 large so as to avoid a situation that the contact area of the engagement blade with a wire of the pulling spring 11 becomes small. On the contrary, with the extension/retraction device 1a having a structure wherein the stopper 14a penetrates a spiral space of the pulling spring 11 while pivoting, it is not necessary to provide a stroke of the stopper 14a in the diameter direction of the pulling spring 11, and therefore it is possible to set the diameter of the engagement tube 5 small. Moreover, a sufficient contact area of the stopper 14a with a wire of the pulling spring 11 can be secured even when the diameter of the pulling spring is small.

As described above, it is possible with the extension/retraction device 1a to adjust the total length to a desired length, in the process, it is also possible to achieve fine adjustment of the length easily. Moreover, it is also possible to reliably engage the engagement section 14 with the pulling spring 11 by a simple operation of operating the operating lever 6 so as to pivot the engagement tube 5. In such a case, it is not necessary to provide the engagement tube 5 with a long stroke in the diameter direction of the engagement tube 5.

Furthermore, force required for extension/retraction of the total length does not vary widely, and this improves the handleability. Also, the pressing spring 10 and the engagement tube 5 are covered completely with the stationary leg section 3 and the movable leg section 4, and therefore it is possible to avoid an accident that a hand of a user is pinched in the pressing spring 10 or an accident that a user touches the engagement tube 5 and the engagement state of the engagement section 24 with the pulling spring 11 is released erroneously.

Also, it is possible to decrease the diameter of the engagement tube 5 or the pulling spring 11 so as to achieve weight reduction of the entire device.

EXAMPLE 2

Figure 6:
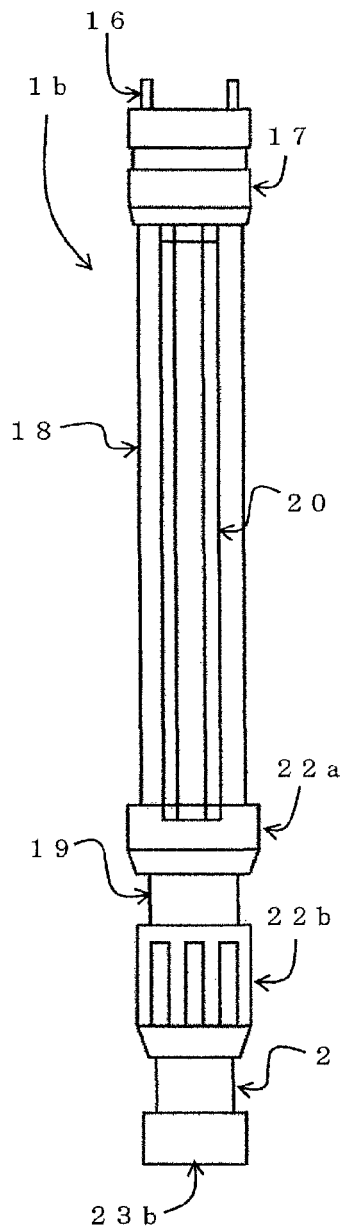
FIG. 6(a) is a front view for illustrating the appearance of Example 2 of an extension/retraction device according to an embodiment of the present invention.
FIG. 6(b) is a view for illustrating a state where a cover of a pulling spring in FIG. 6(a) is detached.
FIG. 6(c) is a side view of FIG. 6(b).
Figure 6:
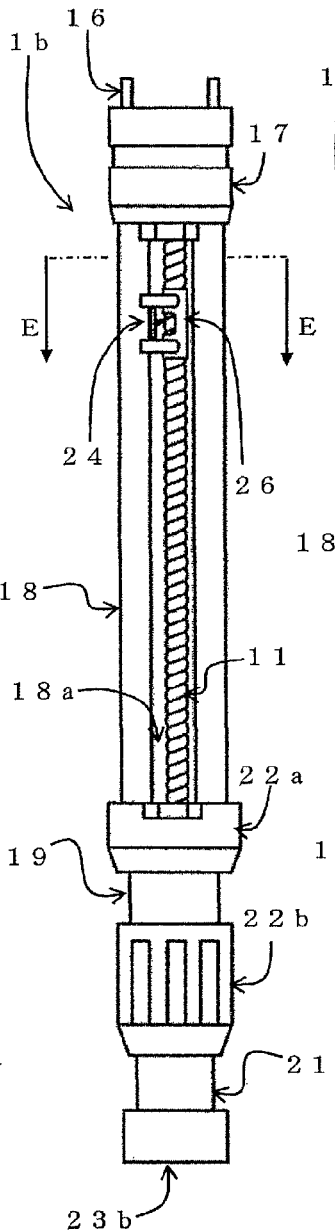
Figure 6:
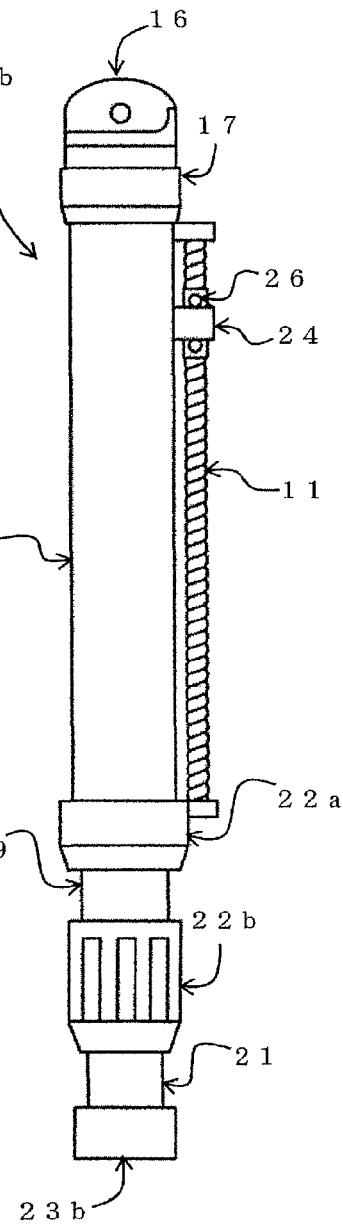
Figure 8:
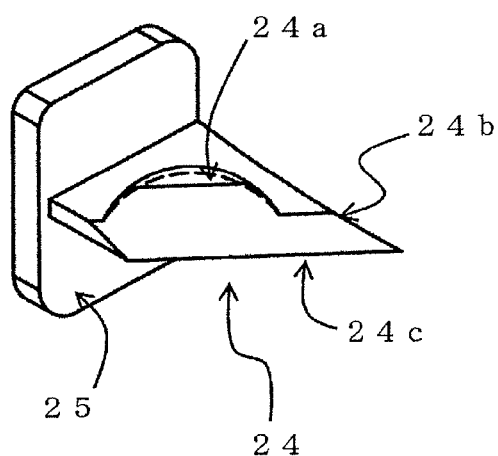
FIG. 8(a) is a perspective appearance view of an engagement section.
FIG. 8(b) is a plan view of an engagement section.
FIG. 8(c) is a side view of an engagement section.
FIG. 8(d) is a front view of an engagement section.
Figure 8:
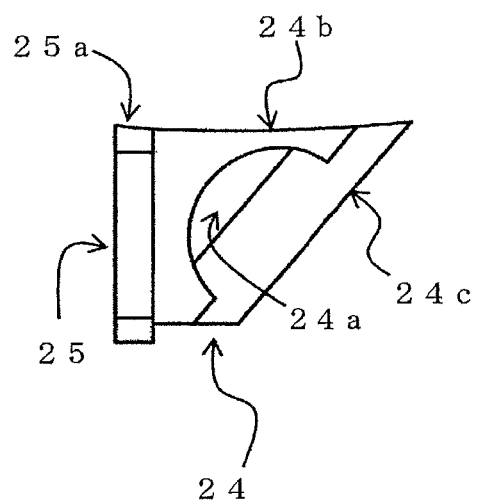
Figure 8:
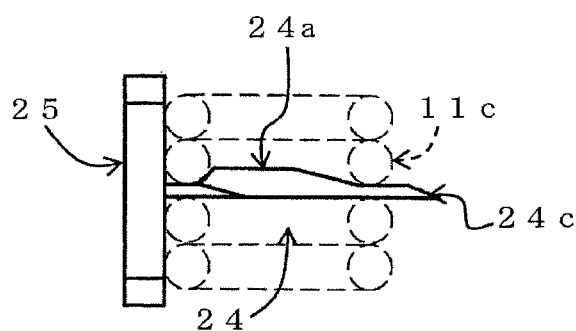
Figure 8:
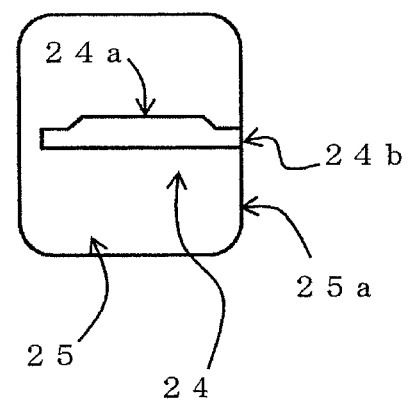
Figure 9:
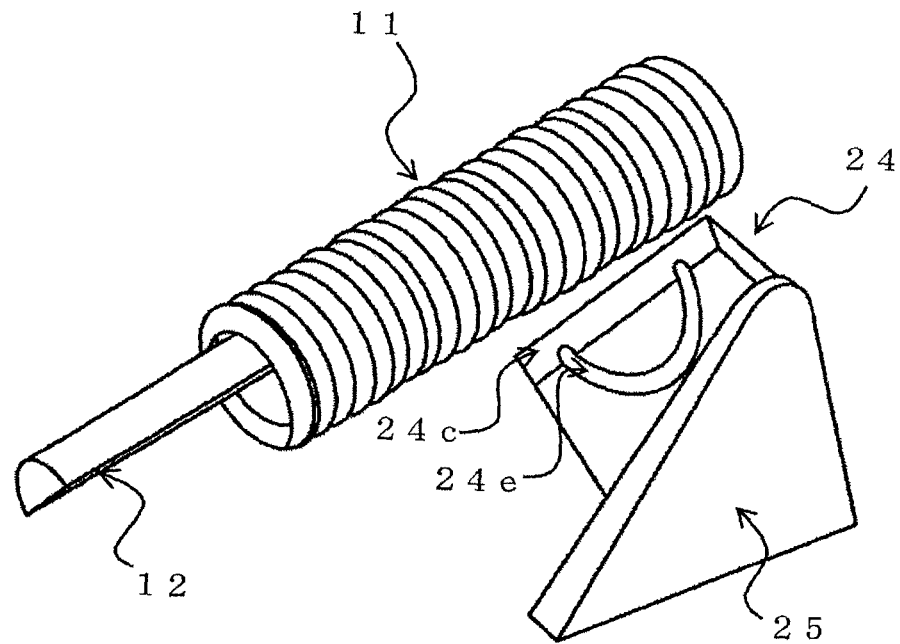
FIGS. 9(a) and 9(b) are perspective views for illustrating a variation example of an engagement section.
Figure 9:
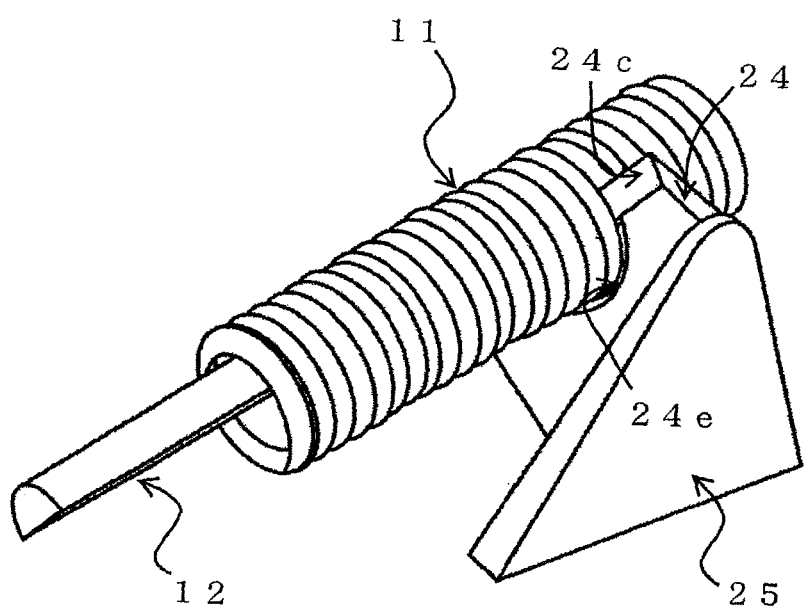

Next, an extension/retraction device of the present example will be described using FIGS. 6 to 15 (corresponding especially to Claims 3 and 4). FIG. 6(a) is a front view for illustrating the appearance of an extension/retraction device 1b of the present example, FIG. 6(b) is a view for illustrating a state where a cover 20 of a pulling spring 11 in FIG. 6(a) is taken out, and FIG. 6(c) is a side view of FIG. 6(b).

Figure 10:
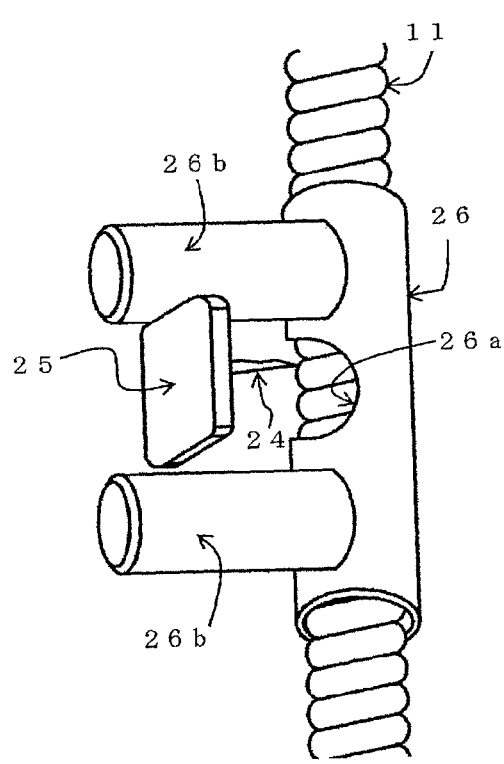
FIGS. 10(a) and 10(b) are views wherein the vicinity of an engagement section and a stopper assist tool is enlarged partially.
Figure 10:
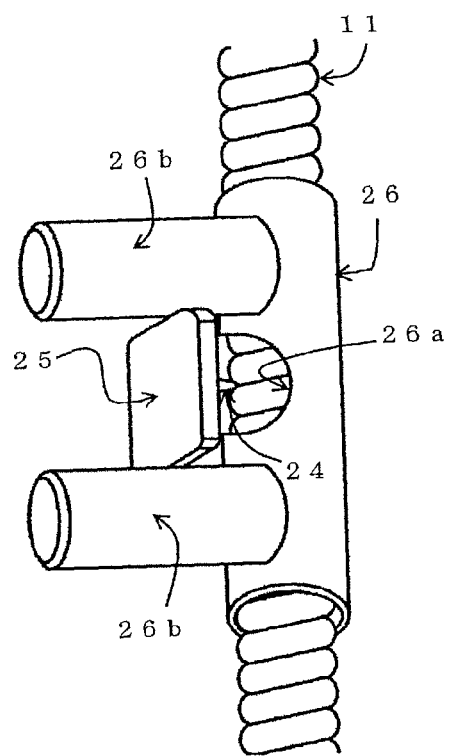
Figure 11:
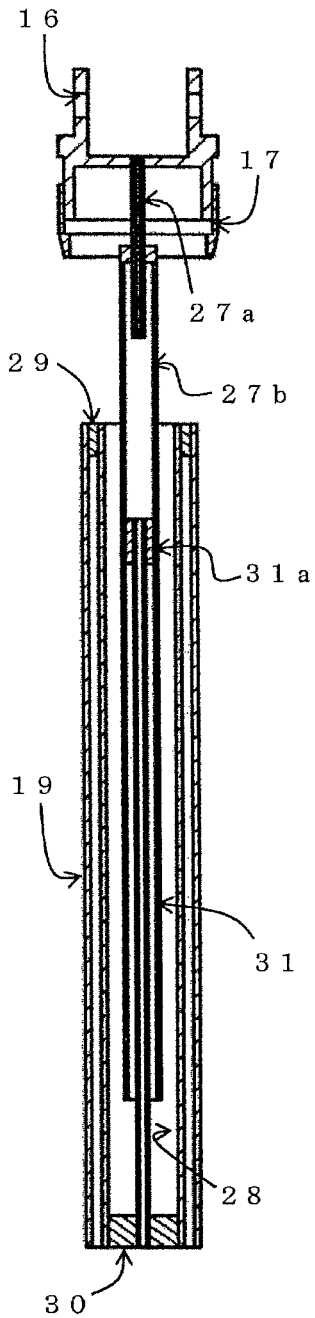
FIG. 11(a) is a longitudinal sectional view for illustrating a state where a coupling section, a receiver, a guide tube and an engagement tube are assembled.
FIGS. 11(b) and 11(c) views for illustrating a state where components in FIG. 11(a) are disassembled.
Figure 11:
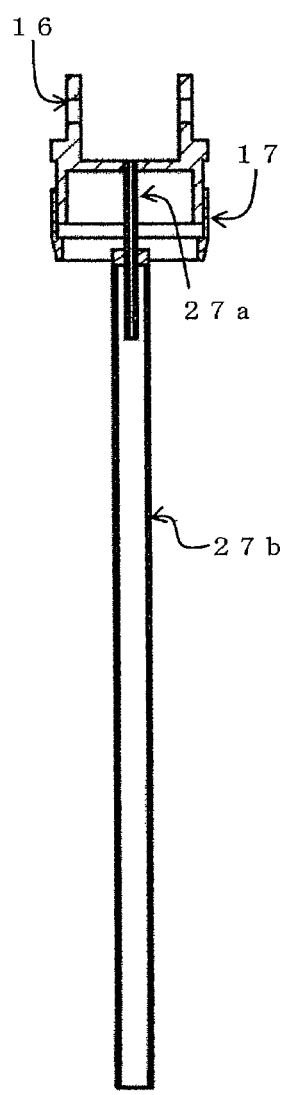
Figure 11:
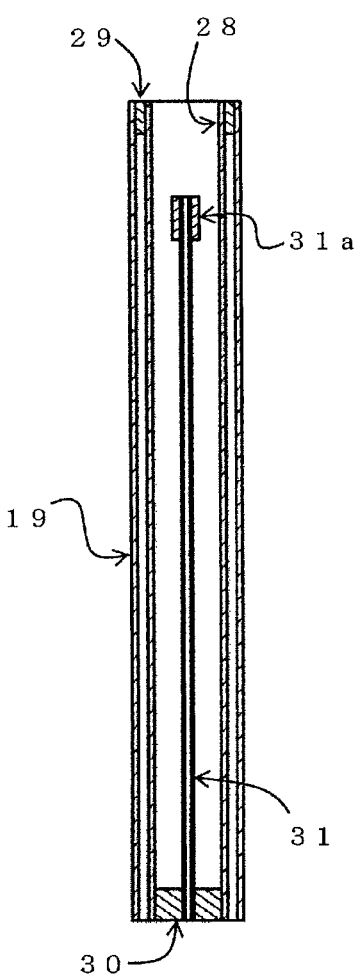
Figure 12:
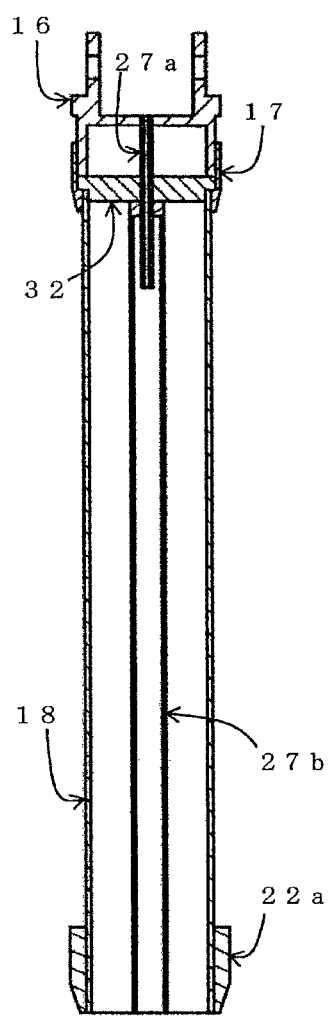
FIG. 12(a) is a longitudinal sectional view for illustrating a state where a coupling section, a receiver, a guide tube and a movable leg section are assembled.
FIG. 12(b) is a view wherein the vicinity of a receiver in FIG. 12(a) is enlarged partially.
FIG. 12(c) is a longitudinal sectional view for illustrating a state where a movable leg section and an engagement tube are assembled.
Figure 12:
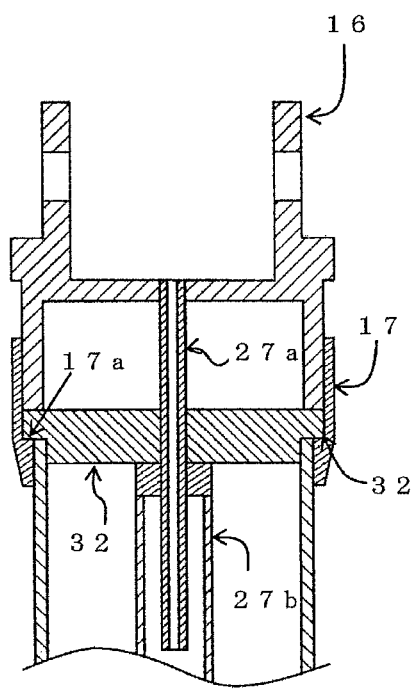
Figure 12:
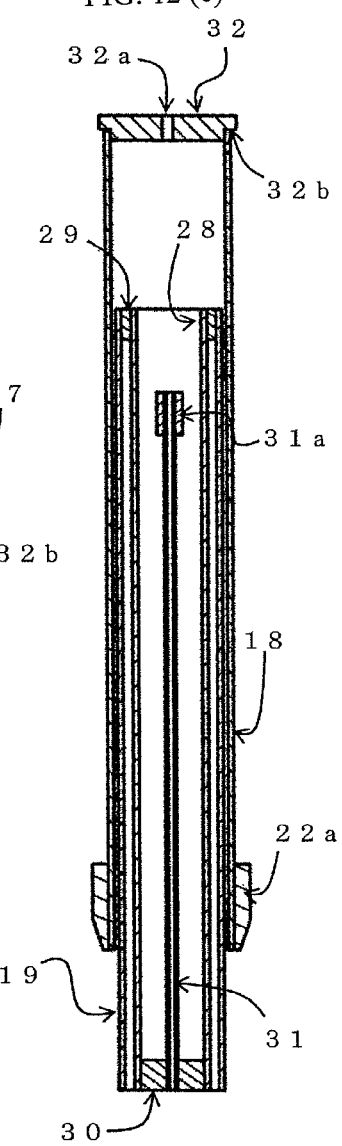

Moreover, FIGS. 7(a) and 7(b) are front views for illustrating the appearance respectively of a movable leg section 18 and an engagement tube 19. FIGS. 8(a) to 8(d) are respectively a perspective appearance view, a plan view, a side view and a front view of an engagement section 24. FIGS. 9(a) and 9(b) are perspective views for illustrating a variation example of an engagement section 24. FIGS. 10(a) and 10(b) are views wherein the vicinity of the engagement section 24 and a stopper assist tool 26 in FIG. 7(a) is enlarged partially. It is to be noted that illustration of the engagement tube 18 is omitted in FIG. 10.

FIG. 11(a) is a longitudinal sectional view for illustrating a state where a coupling section 16, a receiver 17, a support body 27a, a guide tube 27b and the engagement tube 19 are assembled, and FIGS. 11(b) and 11(c) are views for illustrating a state where components in FIG. 11(a) are disassembled. Moreover, FIG. 12(a) is a longitudinal sectional view for illustrating a state where the coupling section 16, the receiver 17, the support body 27a, the guide tube 27b and the movable leg section 18 are assembled, FIG. 12(b) is a view wherein the vicinity of the receiver 17 in FIG. 12(a) is enlarged partially, and FIG. 12(c) is a longitudinal sectional view for illustrating a state where the movable leg section 18 and the engagement tube 19 are assembled.

Figure 14:
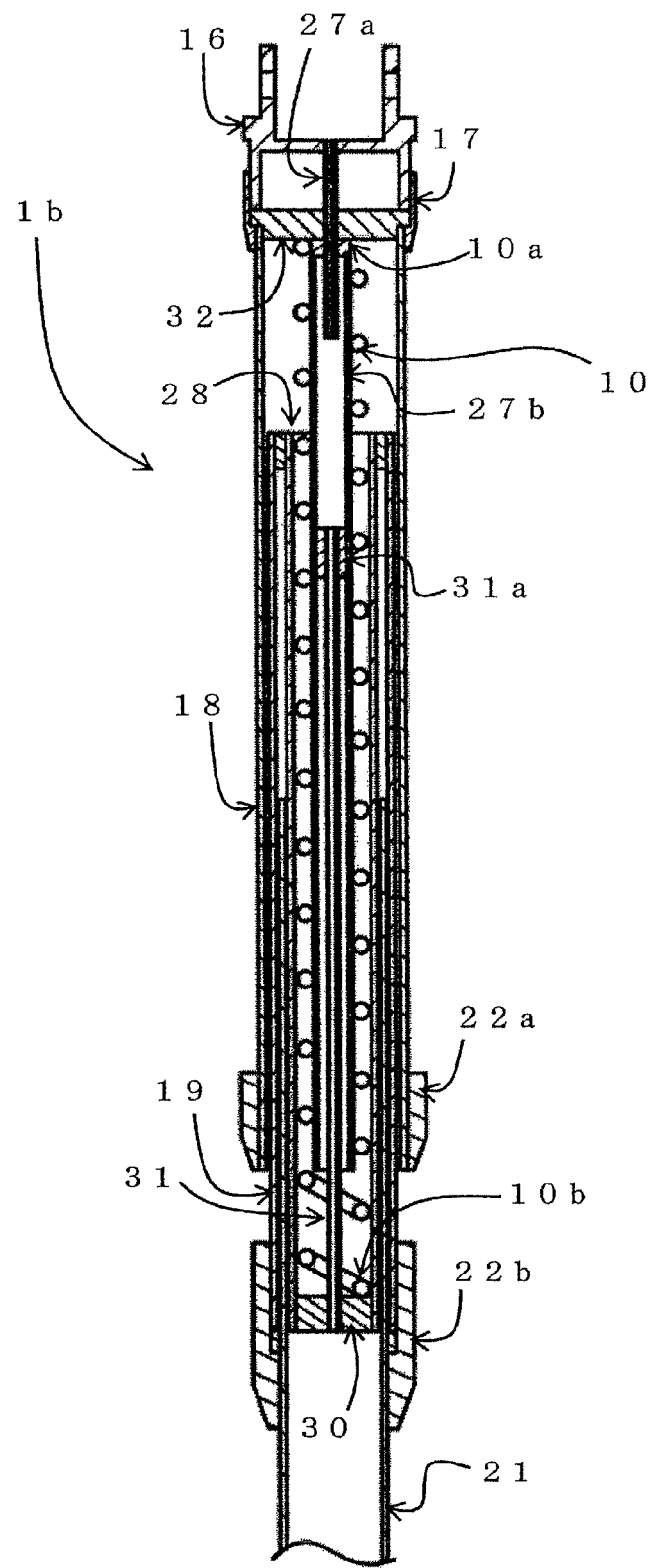
FIG. 14 is a longitudinal sectional view of an extension/retraction device illustrated in FIG. 6(a).
Figure 15:
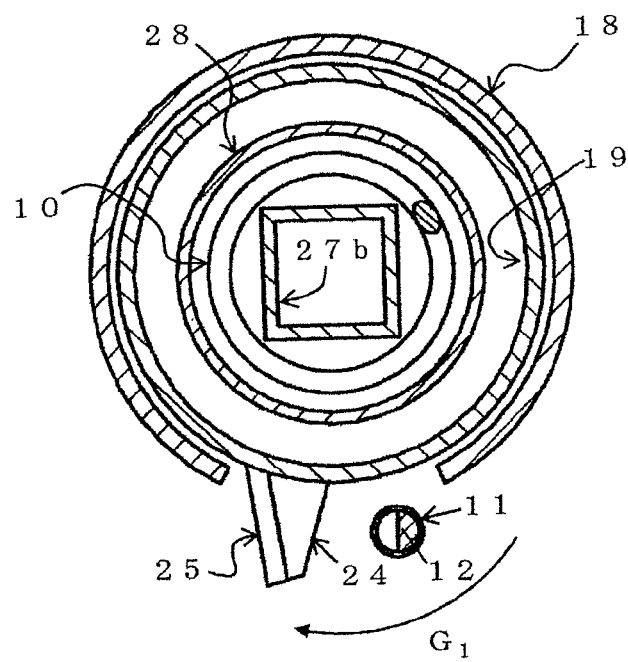
FIGS. 15(a) and 15(b) are enlarged views of a cross section indicated by the arrow E-E in FIG. 6(b).
Figure 15:
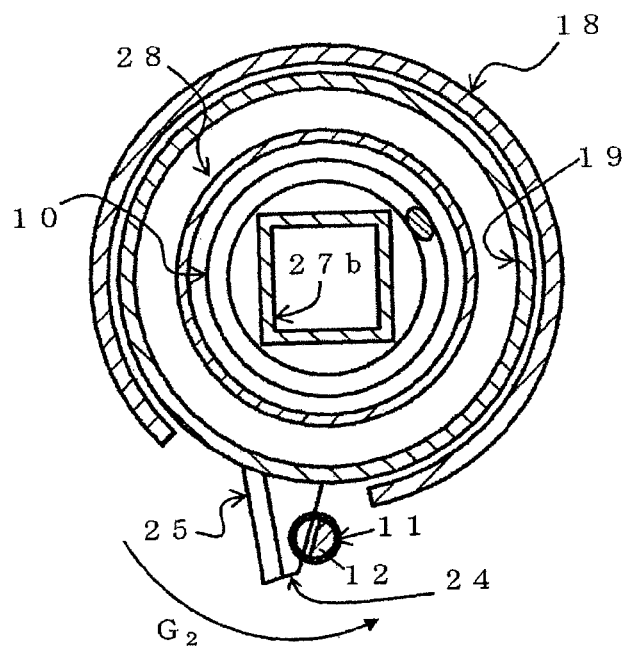

Furthermore, FIG. 13(a) is a longitudinal sectional view for illustrating a state where the engagement tube 19 and an extension/retraction leg section 21 are assembled, and FIG. 13(b) is a view wherein the vicinity of an adjustment tool 22b of the engagement tube 19 in FIG. 13(a) is enlarged. In addition, FIG. 14 is a longitudinal sectional view of the extension/retraction device 1b illustrated in FIG. 6(a), and FIGS. 15(a) and 15(b) are enlarged views of a cross section indicated by the arrow E-E in FIG. 6(b). It is to be noted that illustration of the stopper assist tool 26 and a columnar body 26b is omitted in FIG. 15. The same symbols are attached to constituent elements illustrated in FIGS. 1 to 5, and explanation thereof is omitted.

As illustrated in FIGS. 6 and 7 the extension/retraction device 1b is provided with: the coupling section 16 to be coupled with another device or a member; the receiver 17 on which the coupling section 16 is mounted, a cylindrical movable leg section 18 having an upper end which is connected with the coupling section 16 via the receiver 17 so as to be freely pivotable; the engagement tube 19 which is fitted in the movable leg section 18 so as to be freely slidable; the pulling spring 11 which is installed on a side surface of the movable leg section 18 parallel to the cylinder axis of the movable leg section 18; the cover 20 formed over the pulling spring 11; and the extension/retraction leg section 21 to be fitted in the engagement tube 19 so as to be freely slidable.

Moreover, an annular gripper 22a and the adjustment tool 22b are attached to a lower end respectively of the movable lea section 18 and the engagement tithe 19, and plug bodies 23a and 23b are fitted respectively to upper end of the movable leg section 18 and a lower end of the extension/retraction leg section 21. Furthermore, the engagement section 24 is affixed on a side surface of the engagement tube 19 in the vicinity of the upper end of the engagement tube 19, and the stopper assist tool 26 is fitted on the pulling spring 11 so as to be freely slidable in the axial direction. In addition, a window section 18a is formed on a side surface of the movable leg section 18 along the cylinder axis so that the engagement section 24 is projected and can be engaged with the pulling spring 11.

As illustrated in FIGS. 8(a) to 8(d), the engagement section 24 erected on a mounting plate 25 has substantially a trapezoidal planar view, and has a convex section 24a provided substantially at the center of the engagement section 24 and a blade section 24c formed in a sharp shape. It is to be noted that an edge of the convex section 24a is formed in an arc-like shape so as to be able to be engaged with a wire 11c of the pulling spring 11. Accordingly, when the engagement section 24 approaches the pulling spring 11 and the blade section 24c penetrates a spiral space of the pulling spring 11, the wire 11c of the pulling spring 11 is engaged with the convex section 24a (see FIG. 8(c)). Moreover, a coupling section 24b to be coupled with the engagement tube 19 is formed in an arc-like shape having the same curvature as a side surface of the engagement tube 19. In addition, a side surface 25a of the mounting plate 25 is coupled with a side surface of the engagement tube 19 together with the coupling section 24b of the engagement section 24. Thus, the coupling strength of the engagement section 24 with the engagement tube 19 is enhanced.

It is to be noted that the engagement section 24 may be provided without the convex section 24a but a concave section 24e having an arc-like shape with substantially the same radius as the pulling spring 11 as illustrated in FIG. 9(a). With such a structure, when the engagement section 24 approaches the pulling spring 11 from a state illustrated in FIG. 9(a) and the blade section 24c penetrates a spiral space of the pulling spring 11 as illustrated in FIG. 9(b), the pulling spring 11 is fitted into the concave section 24e. Thus, the blade section 24c rarely comes off the pulling spring 11, and the engagement state of the engagement section 24 with respect to the pulling spring 11 is affixed.

Moreover, as illustrated in FIG. 10, the stopper assist tool 26 to be fitted on the pulling spring 11 is a cylindrical body having an opening 26a substantially at the center of the stopper assist tool 26 in the longitudinal direction, and a pair of columnar bodies 26b and 26b are erected on aside surface of the stopper assist tool 26 with the opening 26a being sandwiched therebetween. Furthermore, the columnar bodies 26b and 26b are installed parallel to the cylinder axis of the stopper assist tool 26 and with a predetermined interval so that the mounting plate 25 can be located therebetween. It is to be noted that the pulling spring 11 moves with pivoting of the movable leg section 18 as will be described later. The engagement section 24 is located between the columnar bodies 26b and 26b together with the stopper assist tool 26 so that the blade section 24c is inserted into and detached from a space of the pulling spring 11 at this time.

As illustrated in FIGS. 11(a) to 11(c), the receiver 17 has an annular shape, and the coupling section 16 is affixed with a lower section thereof being fitted in the receiver 17. Moreover, the rod-shaped support body 27a is erected at the center of the coupling section 16, and the guide tube 27b having a square tube shape is affixed so as to be fitted on the support body 27a. Furthermore, an inner tube 28 is located within the engagement tube 19 so as to be coaxial with the engagement tube 19, so that a double tube structure is formed.

In addition, an upper end of the inner tube 28 is affixed to the engagement tube 19 via the spacer 29, and a lower end of the inner tube 28 is closed by the plug body 30. Moreover, a rod-shaped guide member 31 to be fitted in the guide tube 27b is erected at the center of the plug body 30, and a spacer 31a having a square tube shape is attached to an upper section of the guide member 31 so as to be engaged with the guide tube 27b and inhibit pivoting of the guide member 31 in the circumferential direction.

In addition, the spacer 31a is freely slidable in the direction of the cylinder axis within the guide tube 27b. That is, the guide tube 27b, the guide member 31 and the spacer 31a function as a coupling member for coupling the coupling section 16 with the engagement tube 19 so as not to be pivotable and so as to be slidable. Although the spacer 31a having a square tube shape is installed so as to be slidable within the guide tube 27b having a square tube shape in the present example, it is to be noted that the guide tube 27b and the spacer 31a do not need to have such a shape. For example, the guide tube 27b may have a cylindrical shape, a guide hole may be provided as in Example 1, and a projection to be guided by the guide hole may be provided at the guide tube 31 instead of the spacer 31a.

As illustrated in FIGS. 12(a) and 12(b), a plug body 32 provided with a through hole 32a, into which the support body 27a is to be inserted, at the center is fitted to an upper end of the movable leg section 18. In addition, a stepped section 32b is formed at the plug body 32 so as to project in the radius direction to be engaged with a stepped section 17a of the receiver 17 in a state where the plug body 32 is engaged with the movable leg section 18. Furthermore, the engagement tube 19 is fitted in the movable leg section 18 so as to be freely slidable as illustrated in FIG. 12(c).

It is to be noted that the plug body 32 is first fitted on the support body 27a so as to be freely pivotable in the circumferential direction in order to attach the movable leg section 18 or the guide tube 27b to the coupling section 16 and obtain the state in FIG. 12(a). Next, the guide tube 27b is fitted on the support body 27a and affixed so as not to be pivotable and so as not able to be inserted or removed, and then the plug body 32 is fitted to the movable leg section 18 so as not to be detached.

Furthermore, the coupling section 16 is affixed to the receiver 17 in a state where the movable leg section 18 is inserted into the receiver 17 and a lower section of the coupling section 16 is fitted to the receiver 17 and the stepped section 32b of the plug body 32 is engaged with the stepped section 17a. Thus, the movable leg section 18 is connected with the coupling section 16 and with the guide tube 27b via the receiver 17 so as to be freely pivotable.

As illustrated in FIG. 13(a), the extension/retraction leg section 21 is inserted in a space between the engagement tube 19 and the inner tube 28 so as to be freely slidable. Moreover, a male screw section 33a is formed in the vicinity of the lower end 19a of the engagement tube 19, and a female screw section 33b which can be screwed with the male screw section 33a is formed at a part of an inner circumferential surface of the adjustment tool 22b having an inner diameter formed in a stepped shape. In addition, an elastic member 34 made of synthetic resin is installed between the lower end 19a of the engagement tube 19 and the adjustment tool 22b so that a part of the elastic member 34 can be inserted into a space between the engagement tube 19 and the extension/retraction leg section 21.

Accordingly, when the adjustment tool 22b is pivoted and moved in a direction indicated by the arrow F in FIG. 13(b), the elastic member 34 is pressed by the adjustment tool 22b and a part of the elastic member 34 is pressed into a space between the engagement tube 19 and the extension/retraction leg section 21, and therefore the extension/retraction leg section 21 is pushed against the inner tube 28 by the elastic member 34. As a result, frictional force between the extension/retraction leg section 21 and the inner tube 28 increases, and movement of the extension/retraction leg section 21 in the direction of the cylinder axis with respect to the inner tube 28 is inhibited. Furthermore, as illustrated in FIG. 14, a pressing spring 10 is installed within the movable leg section 18 coaxially with the pressing spring 10 being fitted on the guide tube 27b, an upper end 10a of the pressing spring 10 abuts the plug body 32, and a lower end 10b of the pressing spring 10 is affixed to the plug body 30.

When only the movable leg section 18 is pivoted in the direction of the arrow $G_1$ while the coupling section 16 and the engagement tube 19 are affixed in the state illustrated in FIG. 15(a), the pulling spring 11 pivots together with the movable leg section 18 as illustrated in FIG. 15(b), and the engagement section 24 is pushed into a spiral space of the pulling spring 11. Thus, movement of the pulling spring 11 is inhibited, and the position of the engagement tube 19 in the longitudinal direction with respect to the movable leg section 18 is affixed. At this time, the pulling spring 11 in the extension/retraction device 1b also functions as a length adjustment member.

That is, the extension/retraction device 1b has an effect that the length is decided by pivoting the movable leg section 18 with respect to the engagement tube 19 and engaging the engagement section 24 with the pulling spring 11 which is a length adjustment member.

It is to be noted that, when only the movable leg section 18 is pivoted in the direction of the arrow $G_2$ while the coupling section 16 and the engagement tube 19 are affixed in the state illustrated in FIG. 15(b), the pulling spring 11 pivots together with the movable leg section 18 as illustrated in FIG. 15(a) and the engagement section 24 is removed from a spiral space of the pulling spring 11, and therefore the engagement state of the engagement section 24 with respect to the pulling spring 11 is released. As a result, restraint of the engagement tube 19 with respect to the movable leg section 18 is released, and it becomes possible to extend and retract the extension/retraction device 1b.

The extension/retraction device 1b having such a structure has an effect that the stopper assist tool 26 inhibits flexure of the pulling spring 11 in the process of pushing the engagement section 24 into a spiral space of the pulling spring 11. Thus, it is possible to reliably engage the engagement section 24 with the pulling spring 11. Moreover, checking of the engagement state of the engagement section 24 with the pulling spring 11 is facilitated, since the pulling spring 11 is installed outside the movable leg section 18.

Accordingly, it is possible to achieve inspection, repair or the like of the engagement section 24 or the pulling spring 11 efficiently. Furthermore, it is also possible to decrease the diameter of the movable leg section 18 so as to downsize the entire device. Also, when the coupling section 16 is coupled with another device or the like and the plug body 23b of the extension/retraction leg section 21 is grounded, only the movable leg section 18 becomes pivotable independently of the coupling section 16 and the engagement tube 19, and it is therefore possible to achieve length adjustment of the extension/retraction device 1b safely and easily when the adjustment 22b is operated to make the extension/retraction leg section 21 not pivotable with respect to the engagement tube 19. In addition, since the movable leg section 18 is not affected even when the extension/retraction leg section 21 pivots, there is no fear that the movable leg section 18 pivots and the engagement state of the engagement section 24 with the pulling spring 11 is released unintentionally even when the installation state with respect to the ground is unstable and the extension/retraction leg section 21 pivots, for example. Moreover, it is possible to catch a place of the movable leg section 18 other than the gripper 22a, and this improves the handleability.

EXAMPLE 3

Figure 16:
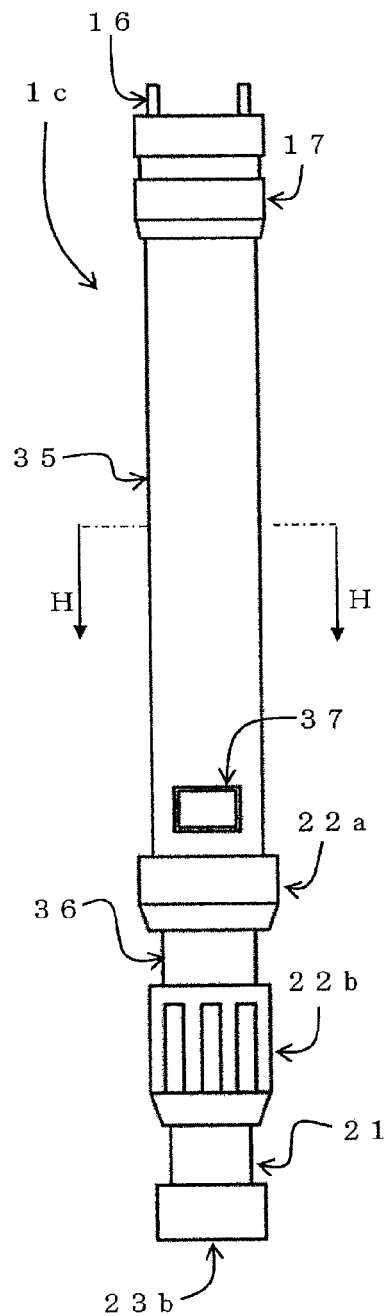
FIG. 16(a) is a front view for illustrating the appearance of Example 3 of an extension/retraction device according to an embodiment of the present invention.
FIG. 16(b) is a front view for illustrating the appearance of a movable leg section.
FIG. 16(c) is a front view for illustrating the appearance of an engagement tube.
Figure 16:
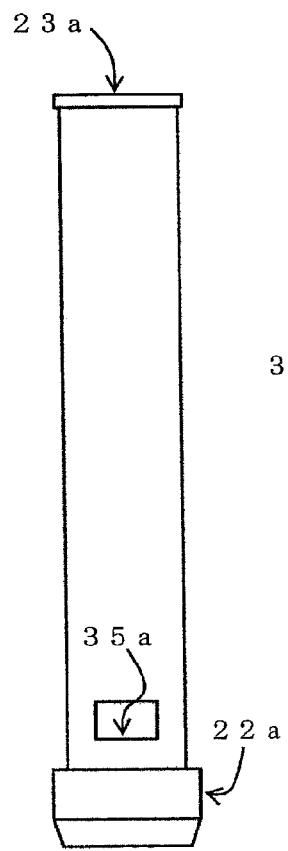
Figure 16:
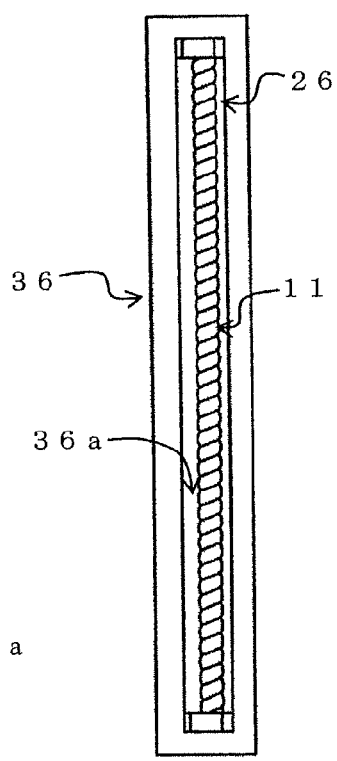

An extension/retraction device of the present example will be explained using FIGS. 16 and 17 (corresponding especially to Claims 5 and 6). FIG. 16(a) is a front view for illustrating the appearance of an extension/retraction device 1c of the present example, and FIGS. 16(b) and 16(c) are front views for illustrating the appearance respectively of a movable leg section 35 and an engagement tube 36. Moreover, FIGS. 17(a) and 17(b) are enlarged views of a cross section indicated by the arrow H-H in FIG. 16(a). It is to be noted that the same symbols are attached to constituent elements illustrated in FIGS. 1 to 15, and explanation thereof will be omitted.

Figure 17:
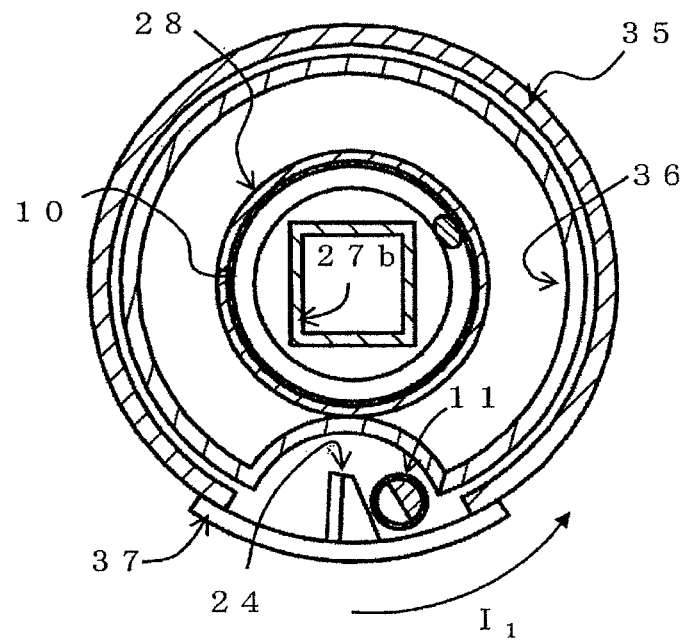
FIGS. 17(a) and 17(b) are enlarged views of a cross section indicated by the arrow H-H in FIG. 16(a).
Figure 17:
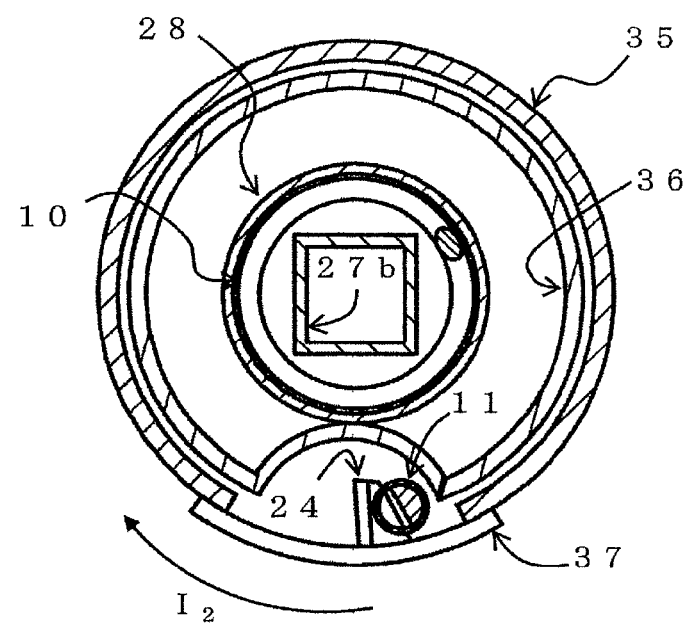

In the extension/retraction device 1c, the pulling spring 11 in the extension/retraction device 1b of Example 2 is not installed at the movable leg section 18 but an engagement section 24 is installed at a movable leg section 35, and the engagement section 24 in the extension/retraction device 1b of Example 2 is not installed at the engagement tube 19 but a pulling spring 11 is installed at the engagement tube 36, as illustrated in FIGS. 16 and 17. That is, the structure of the extension/retraction device 1c and the extension/retraction device 1b is substantially equal, except for the movable leg section 35 and the engagement tube 36.

The movable leg section 35 has a cylindrical shape, and an upper end thereof is connected with a coupling section 16 via a receiver 17 so as to be freely pivotable. Moreover, an opening 35a is provided in the vicinity of a lower end of the movable leg section 35, and the engagement section 24 and a mounting plate 25 are installed on an inner surface of a cover 37 having an arc-like side view formed over the opening 35a so as to project to the inside of the movable leg section 35.

Furthermore, a recessed groove 36a in which the pulling spring 11 is to be held is provided along the longitudinal direction at an engagement tube 36 having substantially a cylindrical shape to be fitted in the movable leg section 35 so as to be freely slidable. In addition, within the recessed groove 36a of the engagement tube 36, the pulling spring 11 is installed parallel to the cylinder axis of the pulling spring 11 so as not to come into contact with an inner surface of the movable leg section 35, and an extension/retraction leg section 21 is fitted in the engagement tube 36 so as to be freely slidable.

When only the movable leg section 35 is pivoted in the direction of the arrow $I_1$ while the coupling section 16 and the engagement tube 36 are affixed in the state illustrated in FIG. 17(a), the engagement section 24 pivots together with the movable leg section 35 as illustrated in FIG. 17(b). As a result, the engagement section 24 is pushed into a spiral space of the pulling spring 11. Thus, movement of the pulling spring 11 is inhibited, and the position of the engagement tube 36 in the longitudinal direction with respect to the movable leg section 35 is affixed.

That is, the extension/retraction device 1c has an effect that the length is decided by pivoting the movable leg section 35 and engaging the engagement section 24 with the pulling spring 11. It is to be noted that, when only the movable leg section 35 is pivoted in the direction of the arrow $I_2$ while the coupling section 16 and the engagement tube 36 are affixed in the state illustrated in FIG. 17(b), the engagement section 24 pivots together with the movable leg section 35 as illustrated in FIG. 17(a) and the engagement section 24 is removed from a spiral space of the pulling spring 11, and therefore restraint of the engagement tube 36 with respect to the movable leg section 35 is released and it becomes possible to extend and retract the extension/retraction device 1c.

In an extension/retraction device 1c having such a structure, simple appearance and excellent design can be obtained since a projected part caused by installation of the engagement section 24 or the pulling spring 11 is not generated on an outer surface of the movable leg section 35. Moreover, it is possible to achieve inspection, repair or the like of the pulling spring 11 easily, since the pulling spring 11 can be viewed easily by detaching the movable leg section 35 from the engagement tube 36.

It is to be noted that the structure of an extension/retraction device of the present invention is not limited to the cases illustrated as Examples 1 to 3. For example, a structure obtained by laminating a plurality of annular bodies may be installed instead of a pulling spring. In such a case, a plurality of places to be engaged with an engagement section exist in a length adjustment member laminated annularly as in a spiral length adjustment member, and therefore it is possible to achieve fine adjustment of the length of an extension/retraction device by engaging an engagement section at a space between annular bodies. Moreover, a flat wire coil spring which has substantially a rectangular cross section and high strength can be used as the pulling spring instead of a coil spring having a normal circular cross section.

An extension/retraction device according to any one of the above described embodiments of the claimed invention is not limited to a leg section of a tripod, a stepladder or the like, but can be applied to an element which is a leg section of various devices and which has a structure that can be extended and retracted.

Further, while the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

DESCRIPTION OF REFERENCE SYMBOLS

1a . . . Extension/retraction device
1b . . . Extension/retraction device
1c . . . Extension/retraction device
2 . . . Base
2a . . . Opening
3 . . . Stationary leg section
3a . . . Opening
4 . . . Movable leg section
4a . . . Guide hole
5 . . . Engagement tube
5a . . . Upper end
5b . . . Lower end
6 . . . Operating lever
7 . . . Plug body
8 . . . Projection
9 . . . Gripper
10 . . . Pressing spring
10a . . . Upper end
10b . . . Lower end
11 . . . Pulling spring
11a . . . Upper end
11b . . . Lower end
11c . . . Wire
12 . . . Core
12a . . . Upper end
12b . . . Lower end
13 . . . Guide tube
13a . . . Upper end
13b . . . Lower end
14 . . . Engagement section
14a . . . Stopper
15 . . . Spacer
15a . . . Inner circumferential surface
16 . . . Coupling section
17 . . . Receiver
17a . . . Stepped section
18 . . . Movable leg section
18a . . . Window section
19 . . . Engagement tube
9a . . . Lower end
20 . . . Cover
21 . . . Extension/retraction leg section
22a . . . Gripper
22b . . . Adjustment tool
23a . . . Plug body
23b . . . Plug body
24 . . . Engagement section
24a . . . Convex section
24b . . . Joint section
24c . . . Blade section
24e . . . Concave section
25 . . . Mounting plate
25a . . . Side surface
26 . . . Stopper assist tool 26a . . . Opening
26b . . . Columnar body
27a . . . Support body
27b . . . Guide tube
28 . . . Inner tube
29 . . . Spacer
30 . . . Plug body
31 . . . Guide member
31a . . . Spacer
32 . . . Plug body
32a . . . Through hole
32b . . . Stepped section
33a . . . Male screw section
33b . . . Female screw section
34 . . . Elastic member
35 . . . Movable leg section
35a . . . Opening
36 . . . Engagement tube
36a . . . Recessed groove
37 . . . Cover

What is claimed is:

1. An extension/retraction device comprising:
a cylindrical movable leg section;
a spiral length adjustment member which is located parallel to a longitudinal direction of the movable leg section;
an engagement section formed to be able to be engaged with the length adjustment member;
an engagement tube on which the engagement section is affixed so as not to be movable and which is to be fitted in the movable leg section so as to be slidable in a longitudinal direction;
an extension/retraction member, which is installed in parallel with the length adjustment member in the movable leg section, for biasing the engagement tube in a direction of separating from the movable leg section;
a stationary leg section in which at least a part of the extension/retraction member and the engagement tube are held and which is fitted in the movable leg section so as to be slidable in a longitudinal direction; and
a guide member for guiding the stationary leg section so as not to be pivotahle and so as to he slidable with respect to the movable leg section,
wherein the engagement tube is installed so as to be pivotahle about a cylinder axis of the movable leg section
wherein the length adjustment member has one end affixed to the movable leg section and the other end installed in the engagement tube so as to be freely slidable in a longitudinal direction,
wherein the engagement section is installed so as to penetrate a space of the length adjustment member while pivoting or so as to be removed from a space while pivoting in conjunction with relative pivoting of the movable leg section and the engagement tube, and
wherein an end of the engagement tube is supported by the stationary leg section so as to be pivotable.

2. An extension/retraction device comprising:
a cylindrical movable leg section;
a spiral length adjustment member which is located parallel to a longitudinal direction of the movable leg section;
an engagement section foamed to be able to he engaged with the length adjustment member;
an engagement tube on which the engagement section is affixed so as not to be movable and which is to be fitted in the movable leg section so as to be slidable in a longitudinal direction; and
an extension/retraction member, which is installed in parallel with the length adjustment member in the movable leg section, for biasing the engagement tube in a direction of separating from the movable leg section,
wherein the engagement tube is installed so as to be pivotable about a cylinder axis of the movable leg section,
wherein the length adjustment member has one end affixed to the movable leg section and the other end installed in the engagement tube so as to be freely slidable in a longitudinal direction,
wherein the engagement section is installed so as to penetrate a space of the length adjustment member while pivoting or so as to be removed from a space while pivoting in conjunction with relative pivoting of the movable leg section and the engagement tube,
wherein the length adjustment member is not installed in the engagement tube so as to be slidable in a longitudinal direction with an end thereof being affixed to the movable leg section but installed on an outer surface of the movable leg section outside the engagement tube with both ends thereof being affixed, and
wherein a window section is formed on at least a part of a side surface of the movable leg section along the cylinder axis so that the engagement section is projected and can be engaged with the length adjustment member.

3. The extension/retraction device according to claim 2, comprising:
a coupling section installed at one of end sections of the movable leg section, in which the engagement tube is not fitted, so as to be freely pivotable about the cylinder axis; and
a coupling member for coupling the coupling section with the engagement tube so as not to be pivotable and so as to be slidable.

4. The extension/retraction device according to claim 2,
wherein the engagement tube is not provided with the engagement section but provided with a recessed groove in which the length adjustment member is held and which is provided at a side surface along a longitudinal direction,
wherein the length adjustment member is not installed at the movable leg section but provided in the recessed groove so as not to come into contact with an inner surface of the movable leg section, and
wherein the movable leg section is not provided with the window section but provided the engagement section which is installed on an inner surface so as to be able to be engaged with the length adjustment member with relative pivoting with respect to the engagement tube.

5. The extension/retraction device according to claim 3,
wherein the engagement tube is not provided with the engagement section but provided with a recessed groove in which the length adjustment member is held and which is provided at a side surface along a longitudinal direction,
wherein the length adjustment member is not installed at the movable leg section but provided in the recessed groove so as not to come into contact with an inner surface of the movable leg section, and
wherein the movable leg section is not provided with the window section but provided with the engagement section which is installed on an inner surface so as to be able to be engaged with the length adjustment member with relative pivoting with respect to the engagement tube.

6. An extension/retraction device comprising:
a cylindrical movable leg section;
a length adjustment member laminated annularly at the movable leg section;
an engagement section formed to he able to be engaged with the length. adjustment member;
an engagement tube on which the engagement section is affixed so as not to be movable and which is to be fitted in the movable leg section so as to be slidable in a longitudinal direction; and
an extension/retraction member. which is installed in parallel with the length adjustment member in the movable leg section, for biasing the engagement tube in a direction of separating from the movable leg section,
a stationary leg section in which at least a part of the extension/retraction member and the engagement tube are held and which is fitted in the movable leg section so as to be slidable in a longitudinal direction; and
a guide member for guiding the stationary leg section so as not to be pivotable and so as to be slidable with respect to the movable leg section,
wherein the engagement tube is installed so as to be pivotable about a cylinder axis of the movable leg section,
wherein the length adjustment member has one end affixed to the movable leg section and the other end installed in the engagement tube so as to be freely slidable in a longitudinal direction,
wherein the engagement section is installed so as to penetrate a space of the length adjustment member while pivoting or so as to be removed from a space while pivoting in conjunction relative pivoting of the movable leg section and the engagement tube, and
wherein an end of the engagement tube is supported by the stationary leg section so as to be pivotable.

7. An extension/retraction device comprising:
a cylindrical movable leg section; a length adjustment member laminated annularly at the movable leg section;
an engagement section formed to be able to be engaged with the length adjustment member;
an engagement tube on which the engagement section is affixed so as not to be movable and which is to be fitted in the movable leg section so as to be slidable in a longitudinal direction; and
an extension/retraction member, which is installed in parallel with the length adjustment member in the movable leg section, for biasing the engagement tube in a direction of separating from the movable leg section,
wherein the engagement tube is installed so as to be pivotable about a cylinder axis of the movable leg section,
wherein the length adjustment member has one end affixed to e movable leg section and the other end installed in the engagement tube so as to be freely slidable in a longitudinal direction, and wherein the engagement section installed so as to penetrate a space of the length adjustment member while pivoting or so as to be removed from a space while pivoting in conjunction with relative pivoting of the movable leg section and the engagement tube,
wherein the length adjustment member is not installed in the engagement tube so as to be slidable in a longitudinal direction with an end thereof being affixed to the movable leg section but installed on an outer surface of the movable leg section outside the engagement tube with both ends thereof being affixed, and
wherein a window section is formed on at least a part of a side surface of the movable leg section along the cylinder axis so that the engagement section is projected and can be engaged with the length adjustment member.

8. The extension/retraction device according to claim 7, comprising:
a coupling section installed at one of end sections of the movable leg section, in which the engagement tube is not fitted, so as to be freely pivotable about the cylinder axis; and
a coupling member for coupling the coupling section with the engagement tube so as not to be pivotable and so as to be slidable.

9. The extension/retraction device according to claim 7,
wherein the engagement tube is not provided with the engagement section but provided with a recessed groove in which the length adjustment member is held and which is provided at a side surface along a longitudinal direction,
wherein the length adjustment member is not installed at the movable leg section but provided in the recessed groove so as not to come into contact with an inner surface of the movable leg section, and
wherein the movable leg section is not provided with the window section but provided with the engagement section which is installed on an inner surface so as to be able to be engaged with the length adjustment member with relative pivoting with respect to the engagement tube.

10. The extension/retraction device according to claim 8,
wherein the engagement tube is not provided with the engagement section but provided with a recessed groove in which the length adjustment member is held and which is provided at a side surface along a longitudinal direction,
wherein the length adjustment member is not installed at the movable leg section but provided in the recessed groove so as not to come into contact with an inner surface of the movable leg section, and
wherein the movable leg section is not provided with the window section but provided with the engagement section which is installed on an inner surface so as to be able to be engaged the length adjustment member with relative pivoting with respect to the engagement tube.

* * * * *